United States Patent
Inoue

(10) Patent No.: US 12,371,016 B2
(45) Date of Patent: Jul. 29, 2025

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventor: Daichi Inoue, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 191 days.

(21) Appl. No.: 18/231,850

(22) Filed: Aug. 9, 2023

(65) Prior Publication Data
US 2024/0051532 A1 Feb. 15, 2024

(30) Foreign Application Priority Data
Aug. 12, 2022 (JP) .................. 2022-128962

(51) Int. Cl.
*B60W 30/12* (2020.01)
*B60W 60/00* (2020.01)
*G06V 20/56* (2022.01)

(52) U.S. Cl.
CPC .......... *B60W 30/12* (2013.01); *B60W 60/001* (2020.02); *G06V 20/588* (2022.01);
(Continued)

(58) Field of Classification Search
CPC ............... B60W 30/12; B60W 60/001; B60W 2420/403; B60W 2552/53;
(Continued)

(56) References Cited

U.S. PATENT DOCUMENTS 10,678,261 B2 * 6/2020 Baldwin ......... B60W 30/18163
2018/0181820 A1 6/2018 Ide
(Continued)

FOREIGN PATENT DOCUMENTS

| JP | 2017-045356 | 3/2017 |
|----|-------------|--------|
| JP | 2017-054296 | 3/2017 |

(Continued)

OTHER PUBLICATIONS

Japanese Notice of Allowance for Japanese Patent Application No. 2022-128962 mailed Jan. 16, 2024.

*Primary Examiner* — Thomas Ingram
(74) *Attorney, Agent, or Firm* — Amin, Turocy & Watson, LLP

(57) ABSTRACT

A vehicle control device according to an embodiment includes a first recognizer that recognizes a surrounding situation including a first partition line partitioning a traveling lane, a second recognizer that recognizes a second partition line partitioning a lane around from map information; and a driving controller that executes driving control, wherein the driving controller executes the driving control based on the first partition line in a case in which the first partition line does not match the second partition line, a preceding vehicle traveling in front of a vehicle is recognized, and an amount of change in a distance between the first partition line and a traveling trajectory of the preceding vehicle is smaller than a threshold value, when the vehicle travels in a lane change section, and curbs the driving control in a case in which the amount of change is equal to or larger than the threshold value.

9 Claims, 14 Drawing Sheets

(52) U.S. Cl.
CPC ... *B60W 2420/403* (2013.01); *B60W 2552/53* (2020.02); *B60W 2554/80* (2020.02)

(58) Field of Classification Search
CPC .. B60W 2554/80; B60W 30/10; B60W 30/18; B60W 40/02; B60W 40/06; B60W 30/18163; B60W 10/04; B60W 10/20; G06V 20/588; G06V 10/44
See application file for complete search history.

(56) References Cited

U.S. PATENT DOCUMENTS

| | | | |
|---|---|---|---|
| 2018/0281790 A1* | 10/2018 | Oyama | G05D 1/0274 |
| 2018/0364734 A1* | 12/2018 | Ferguson | G05D 1/0272 |
| 2019/0225220 A1* | 7/2019 | Laine | G05D 1/0293 |
| 2021/0284149 A1* | 9/2021 | Kato | B60W 50/082 |
| 2021/0402992 A1* | 12/2021 | Morimoto | B60W 30/12 |
| 2025/0050906 A1* | 2/2025 | Lee | B60W 30/12 |
| 2025/0108687 A1* | 4/2025 | Kudo | B60K 31/00 |
| 2025/0108795 A1* | 4/2025 | Oniwa | B60W 40/08 |

FOREIGN PATENT DOCUMENTS

| | | |
|---|---|---|
| JP | 2018-039285 | 3/2018 |
| JP | 2018-084960 | 5/2018 |
| JP | 2018-103863 | 7/2018 |
| JP | 2018-173304 | 11/2018 |
| JP | 2021-146767 | 9/2021 |

* cited by examiner

VEHICLE CONTROL DEVICE, VEHICLE CONTROL METHOD, AND STORAGE MEDIUM

CROSS-REFERENCE TO RELATED APPLICATION

Priority is claimed on Japanese Patent Application No. 2022-128962, filed on Aug. 12, 2022, the content of which is incorporated herein by reference.

BACKGROUND

Field of the Invention

The present invention relates to a vehicle control device, a vehicle control method, and a storage medium.

Background of the Invention

In recent years, efforts to provide access to a sustainable transportation system that considers vulnerable people among transportation participants have become active. In order to realize this, research and development has been focused on further improving the safety and convenience of transportation through research and development regarding an automated driving technology. In relation thereto, a technology for setting a priority for each of a plurality of travel path boundaries present on the left and right of a host vehicle from target position data, and collating target position data of the travel path boundary with high priority with target position information included in map information to estimate a position of the host vehicle is known (for example, Japanese Unexamined Patent Application, First Publication No. 2018-084960).

SUMMARY OF THE INVENTION

Incidentally, in an automated driving technology, there are problems that road partition lines partitioning a traveling lane may not be able to be appropriately recognized, and automated driving cannot be continued depending on the accuracy of recognition of the surroundings of a vehicle using a camera or the like, the accuracy of map information, an update timing, or the like.

In order to solve the above problems, an object of an aspect of the present invention is to provide a vehicle control device, a vehicle control method, and a storage medium capable of executing more appropriate driving control according to a result of recognizing surroundings of a vehicle. Another object is to contribute to the development of a sustainable transportation system.

A vehicle control device, vehicle control method, and storage medium according to the present invention adopt the following configurations.

(1): A vehicle control device according to an aspect of the present invention is a vehicle control device including: a first recognizer configured to recognize a surrounding situation of a host vehicle including a first partition line partitioning a traveling lane of the host vehicle, on the basis of an output of a detection device detecting the surrounding situation of the host vehicle; a second recognizer configured to recognize a second partition line partitioning a lane around the host vehicle from map information on the basis of position information of the host vehicle; and a driving controller configured to execute driving control for controlling at least steering out of steering and speed of the host vehicle on the basis of recognition results of the first recognizer and the second recognizer, wherein the driving controller executes the driving control based on the first partition line in a case in which the first partition line does not match the second partition line, a preceding vehicle traveling in front of the host vehicle is recognized by the first recognizer, and an amount of change in a distance between the first partition line and a traveling trajectory of the preceding vehicle is smaller than a threshold value, when the host vehicle travels in a lane change section, and curbs the driving control in a case in which the amount of change is equal to or larger than the threshold value.

(2): In the aspect (1), the driving controller executes the driving control based on the second partition line when two first partition lines partitioning the traveling lane are present in a lane partitioned by two second partition lines.

(3): In the aspect (2), the driving controller executes the driving control based on the second partition line in a case in which one of the two first partition lines is not present in the lane, and a distance between the first partition line and the second partition line is greater than a vehicle width of the preceding vehicle, and executes the driving control based on the first partition line in a case in which the distance is equal to or smaller than the vehicle width.

(4): In the aspect (1), the driving controller curbs the driving control when the preceding vehicle moves from the traveling lane of the host vehicle to another lane.

(5): In the aspect (1), the driving controller continues the driving control until a predetermined period of time has elapsed or the vehicle travels a predetermined distance after the driving controller executes the driving control in a case in which the first partition line matches the second partition line after the driving controller executes the driving control.

(6): In the aspect (1), the driving controller ends the driving control after a predetermined period of time has elapsed or after the vehicle has traveled a predetermined distance after the driving controller executes the driving control.

(7): In the aspect (1), the driving controller executes the driving control when the host vehicle or a user of the host vehicle has an authority to execute the driving control.

(8): A vehicle control method according to an aspect of the present invention is a vehicle control method including: recognizing, by a computer, a surrounding situation of a host vehicle including a first partition line partitioning a traveling lane of the host vehicle, on the basis of an output of a detection device detecting the surrounding situation of the host vehicle; recognizing, by the computer, a second partition line partitioning a lane around the host vehicle from map information on the basis of position information of the host vehicle; executing, by the computer, driving control for controlling at least steering out of steering and speed of the host vehicle on the basis of recognition results; and executing, by the computer, the driving control based on the first partition line in a case in which the first partition line does not match the second partition line, a preceding vehicle traveling in front of the host vehicle is recognized, and an amount of change in a distance between the first partition line and a traveling trajectory of the preceding vehicle is smaller than a threshold value, when the host vehicle travels in a lane change section, and curbing the driving control in a case in which the amount of change is equal to or larger than the threshold value.

(9): A storage medium according to an aspect of the present invention is a computer-readable non-transitory storage medium having a program stored therein, the program causing a computer to: recognize a surrounding situation of a host vehicle including a first partition line partitioning a traveling lane of the host vehicle, on the basis of an output of a detection device detecting the surrounding situation of the host vehicle; recognize a second partition line partitioning a lane around the host vehicle from map information on the basis of position information of the host vehicle; execute driving control for controlling at least steering out of steering and speed of the host vehicle on the basis of recognition results; and execute the driving control based on the first partition line in a case in which the first partition line does not match the second partition line, a preceding vehicle traveling in front of the host vehicle is recognized, and an amount of change in a distance between the first partition line and a traveling trajectory of the preceding vehicle is smaller than a threshold value, when the host vehicle travels in a lane change section, and curb the driving control in a case in which the amount of change is equal to or larger than the threshold value.

According to the aspects (1) to (9), it is possible to execute more appropriate driving control according to a result of recognizing surroundings of a vehicle.

DETAILED DESCRIPTION OF THE INVENTION

Hereinafter, embodiments of a vehicle control device, a vehicle control method, and a storage medium of the present invention will be described with reference to the drawings. Hereinafter, an embodiment in which the vehicle control device is applied to an automated driving vehicle will be described by way of example. The automated driving is, for example, to automatically control one or both of steering and speed of a vehicle to execute driving control. Examples of the above-described driving control may include driving control such as an Adaptive Cruise Control System (ACC), Traffic Jam Pilot (TJP), Lane Keeping Assistance System (LKAS), Automated Lane Change (ALC), and Collision Mitigation Brake System (CMBS). In the automated driving vehicle, driving control according to a manual operation (so-called manual driving) of a user (for example, an occupant) of the vehicle may be executed. Hereinafter, a case in which a left-hand traffic regulation is applied will be described, but right and left may be reversed when a right-hand traffic regulation is applied.

[Overall Configuration]

Figure 1:
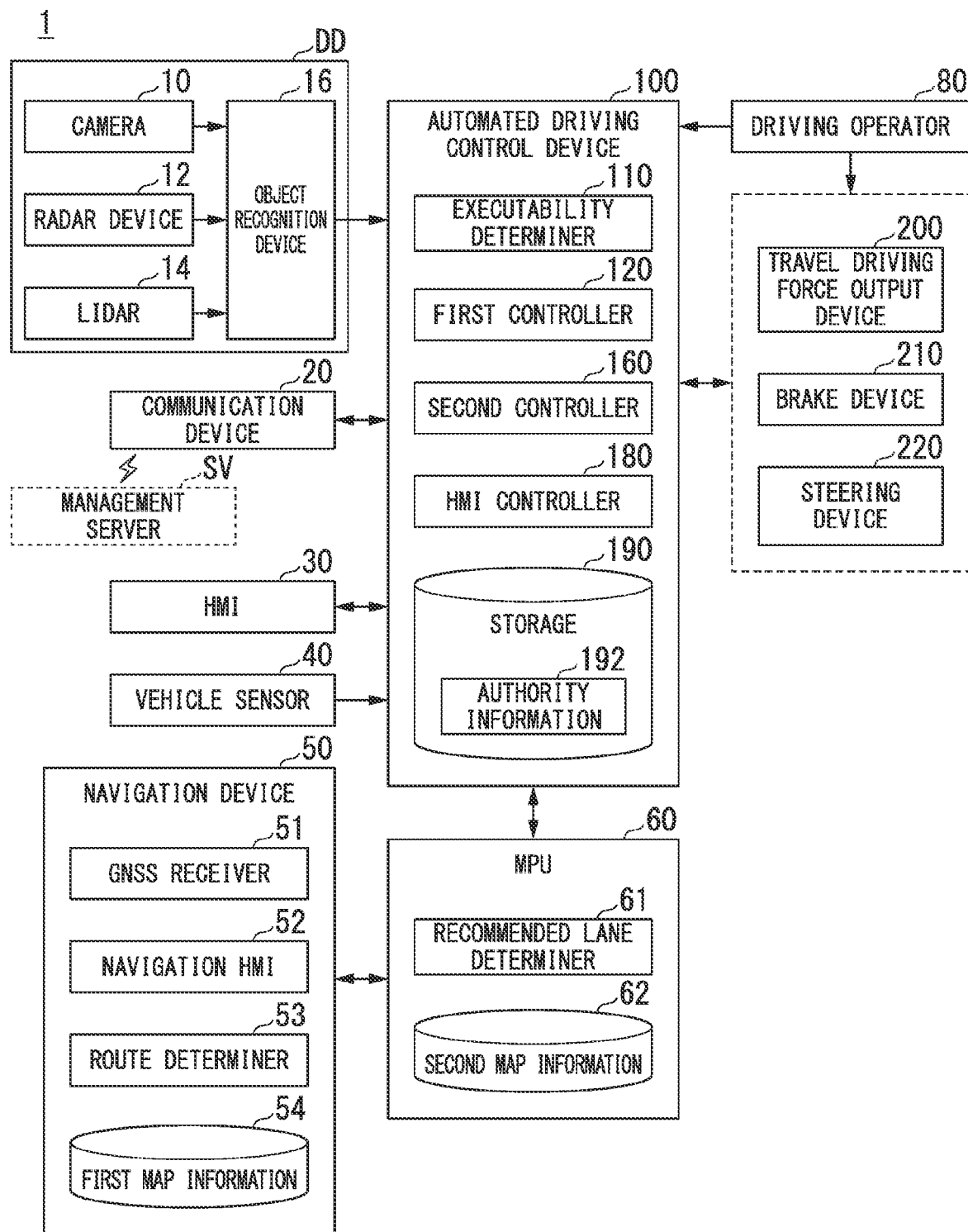
FIG. 1 is a configuration diagram of a vehicle system including a vehicle control device according to an embodiment.

FIG. 1 is a configuration diagram of a vehicle system 1 including a vehicle control device according to an embodiment. A vehicle on which the vehicle system 1 is mounted (hereinafter referred to as a host vehicle M) is, for example, a vehicle such as a two-wheeled vehicle, a three-wheeled vehicle, or a four-wheeled vehicle, and a driving source thereof includes an internal combustion engine such as a diesel engine or a gasoline engine, an electric motor, or a combination thereof. The electric motor operates using power generated by a power generator connected to the internal combustion engine or discharge power of a battery (storage battery) such as a secondary battery or a fuel cell.

The vehicle system 1 includes, for example, a camera 10, a radar device 12, a light detection and ranging (LIDAR) 14, an object recognition device 16, a communication device 20, a human machine interface (HMI) 30, a vehicle sensor 40, a navigation device 50, a map positioning unit (MPU) 60, a driving operator 80, an automated driving control device 100, a travel driving force output device 200, a brake device 210, and a steering device 220. These devices or equipment are connected to each other by a multiplex communication line such as a controller area network (CAN) communication line, a serial communication line, a wireless communication network, or the like. The configuration shown in FIG. 1 is merely an example, and a part of the configuration may be omitted or other configurations may be added thereto. A combination of the camera 10, the radar device 12, the LIDAR 14, and the object recognition device 16 is an example of a "detection device DD". The HMI 30 is an example of an "output device". The automated driving control device 100 is an example of a "driving controller".

The camera 10 is, for example, a digital camera using a solid-state imaging device such as a charge coupled device (CCD) or a complementary metal oxide semiconductor (CMOS). The camera 10 is attached to any location on a host vehicle M on which the vehicle system 1 is mounted. When a forward side is imaged, the camera 10 is attached to an upper portion of a front windshield, a back door, or the like. When a backward side is imaged, the camera 10 is attached to an upper portion of a rear windshield, a back door, or the like. When a sideward side of the host vehicle M are imaged, the camera 10 is attached to a door mirror or the like. The camera 10, for example, periodically and repeatedly images surroundings of the host vehicle M. The camera 10 may be a stereo camera.

The radar device 12 radiates radio waves such as millimeter waves to the surroundings of the host vehicle M and detects radio waves (reflected waves) reflected by an object to detect at least a position (a distance and orientation) of the object. The radar device 12 is attached to any location on the host vehicle M. The radar device 12 may detect a position and a speed of the object using a frequency modulated continuous wave (FM-CW) scheme.

The LIDAR 14 irradiates the surroundings of the host vehicle M with light and measures scattered light. The LIDAR 14 detects a distance to a target on the basis of a time from light emission to light reception. The light to be radiated is, for example, pulsed laser light. The LIDAR 14 is attached to any location on the host vehicle M.

The object recognition device 16 performs sensor fusion processing on detection results of some or all of the camera 10, the radar device 12, and the LIDAR 14 to recognize a position, type, speed, and the like of the object. The object recognition device 16 outputs recognition results to the automated driving control device 100. The object recognition device 16 may output detection results of the camera 10, the radar device 12, and the LIDAR 14 as they are to the automated driving control device 100. In this case, the object recognition device 16 may be omitted from a configuration of the vehicle system 1 (the detection device DD).

The communication device 20 uses, for example, a network such as a cellular network, a Wi-Fi network, Bluetooth (registered trademark), Dedicated Short Range Communication (DSRC), local area network (LAN), wide area network (WAN), and the Internet to communicate with another vehicle present around the host vehicle M, a terminal device of a user who uses the host vehicle M, or various server devices such as a management server SV.

The HMI 30 outputs various types of information to the occupant of the host vehicle M and receives an input operation from the occupant. The HMI 30 includes, for example, various display devices, speakers, buzzers, touch panels, switches, keys, and microphones.

The vehicle sensor 40 includes, for example, a vehicle speed sensor that detects a speed of the host vehicle M, an acceleration sensor that detects an acceleration, a yaw rate sensor that detects a yaw rate (for example, a rotational angular velocity around a vertical axis passing through a centroid of the host vehicle M), and an orientation sensor that detects a direction of the host vehicle M. The vehicle sensor 40 may be provided with a position sensor that detects a position of the vehicle. The position sensor is an example of a "position measurer". The position sensor is, for example, a sensor that acquires position information (longitude and latitude information) from a global positioning system (GPS) device. The position sensor may be a sensor that acquires the position information using a global navigation satellite system (GNSS) receiver 51 of the navigation device 50. The vehicle sensor 40 may derive the speed of the host vehicle M from a difference (that is, a distance) in positional information at a predetermined time in the position sensor. A detection result of the vehicle sensor 40 is output to the automated driving control device 100.

The navigation device 50 includes, for example, the GNSS receiver 51, a navigation HMI 52, and a route determiner 53. The navigation device 50 holds first map information 54 in a storage device such as a hard disk drive (HDD) or a flash memory. The GNSS receiver 51 specifies the position of the host vehicle M on the basis of a signal received from a GNSS satellite. The position of the host vehicle M may be specified or complemented by an inertial navigation system (INS) using an output of the vehicle sensor 40. The navigation HMI 52 includes a display device, a speaker, a touch panel, keys, and the like. The GNSS receiver 51 may be provided in the vehicle sensor 40. The navigation HMI 52 may be partly or wholly shared with the HMI 30 described above. The route determiner 53, for example, determines a route (hereinafter, an on-map route) from the position of the host vehicle M specified by the GNSS receiver 51 (or any input position) to a destination input by the occupant using the navigation HMI 52 by referring to the first map information 54. The first map information 54 is, for example, information in which a road shape is represented by links indicating roads and nodes connected by the links. The first map information 54 may include point of interest (POI) information, and the like. The on-map route is output to the MPU 60. The navigation device 50 may perform route guidance using the navigation HMI 52 on the basis of the on-map route. The navigation device 50 may transmit a current position and a destination to a navigation server via the communication device 20 and acquire the same route as the on-map route from the navigation server. The navigation device 50 outputs the determined on-map route to the MPU 60.

The MPU 60 includes, for example, a recommended lane determiner 61, and holds second map information 62 in a storage device such as an HDD or a flash memory. The recommended lane determiner 61 divides the on-map route provided from the navigation device 50 into a plurality of blocks (for example, divides the route every 100 [m] in a traveling direction of the vehicle), and determines a recommended lane for each block by referring to the second map information 62. The recommended lane determiner 61 determines in which lane from the left the host vehicle M travels. The recommended lane determiner 61 determines the recommended lane so that the host vehicle M can travel on a reasonable route for travel to a branch destination when there is a branch location in the on-map route.

The second map information 62 is map information with higher accuracy than the first map information 54. The second map information 62 includes, for example, the number of lanes, types of road partition lines (hereinafter referred to as partition lines), information on centers of lanes, and information on road boundaries. The second map information 62 may include information indicating whether or not the road boundary is a boundary including a structure through which the vehicle cannot pass (including cross or contact). The structure is, for example, a guardrail, a curb, a median, and a fence. "Cannot pass through" may include the presence of a step that is so low that the vehicle can pass when a vibration of the vehicle that cannot normally occur is allowed. The second map information 62 may include road shape information, traffic regulation information, address information (address and zip code), facility information, parking lot information, telephone number information, and the like. The road shape information is, for example, a curvature radius (or curvature), width, and slope of a road. The second map information 62 may be updated at any time by the communication device 20 communicating with an external device. The first map information 54 and the second map information 62 may be integrally provided as map information. The map information may be stored in the storage 190.

The driving operator 80 includes, for example, a steering wheel, an accelerator pedal, and a brake pedal. The driving operator 80 may include a shift lever, a modified steering wheel, a joystick, or other operators. An operation detector that detects an amount of operation with respect to the operator by the occupant or presence or absence of the operation, for example, is attached to each operator of the driving operator 80. The operation detector detects, for example, a steering angle or steering torque of the steering wheel, and an amount of depression of the accelerator pedal or the brake pedal. The operation detector outputs detection result to one or both of the automated driving control device 100, and the travel driving force output device 200, the brake device 210 and the steering device 220.

The automated driving control device 100 executes various driving controls belonging to the automated driving for the host vehicle M. The automated driving control device 100 includes, for example, an executability determiner 110, a first controller 120, a second controller 160, the HMI controller 180, and a storage 190. The executability determiner 110, the first controller 120, the second controller 160, and the HMI controller 180 are realized, for example, by a hardware processor such as a central processing unit (CPU) executing a program (software). Some or all of these components may be realized by hardware (circuit; including circuitry) such as a large scale integration (LSI), an application specific integrated circuit (ASIC), a field-programmable gate array (FPGA), or a graphics processing unit (GPU), or may be realized by software and hardware in cooperation. The above-described program may be stored in a storage device (a storage device including a non-transitory storage medium) such as an HDD or a flash memory of the automated driving control device 100 in advance or may be stored in a detachable storage medium such as a DVD, a CD-ROM, or a memory card and installed in the storage device of the automated driving control device 100 by the storage medium (a non-transitory storage medium) being mounted in a drive device, a card slot, or the like.

The storage 190 may be realized by various storage devices described above, an electrically erasable programmable read only memory (EEPROM), a read only memory (ROM), a random access memory (RAM), or the like. The storage 190 stores, for example, authority information 192, various types of information in the embodiment, and programs. Information indicating whether or not the host vehicle M or an occupant (for example, a driver) of the host vehicle M is permitted to execute driving control (for example, control in the first controller 120 and the second controller 160) in the present embodiment, for example, is stored in the authority information 192. A period of time (for example, until Dec. 31, 2022) or the number of times (remaining 150 times) in which the driving control can be executed may be stored in the authority information. The number of times is, for example, the number of times when a section from start (ignition on) to end (ignition off) of an operation of the host vehicle M is one time. The storage 190 may store map information (for example, the first map information 54 and the second map information 62).

The executability determiner 110 determines whether or not the host vehicle M or the occupant has an authority to execute the driving control in the present embodiment (hereinafter referred to as an execution authority), permits the first controller 120, the second controller 160, or the like to execute the driving control when the host vehicle M or the occupant has the execution authority, and prohibits the execution of the above-described driving control when the host vehicle M or the occupant do not have the execution authority. The presence or absence of the execution authority is managed by, for example, the management server SV, and the execution authority in a predetermined period of time or at a predetermined number of times according to a charging amount or the like is granted by obtaining usage permission through prior registration or the like.

Here, an executability determination will be described in detail. For example, the executability determiner 110 acquires one or both of identification information for identifying the host vehicle M and identification information for identifying the occupant. In this case, the executability determiner 110 may acquire identification information of the host vehicle M stored in the storage 190 in advance, or may acquire the identification information by the HMI 30 receiving an input of the identification information from the occupant. In this case, the executability determiner 110 may cause information (image and sound) for requesting the HMI controller 180 to input identification information of the occupant to be output from the HMI 30.

When the executability determiner 110 acquires the identification information, the executability determiner 110 transmits the identification information to the management server SV, which manages the use of driving control in the embodiment via the communication device 20, to inquire about the execution authority. The management server SV receives the identification information transmitted from the host vehicle M, acquires execution authority information for driving control associated with the received identification information, and transmits the acquired execution authority information to the host vehicle M. The executability determiner 110 receives the execution authority information transmitted by the management server SV, permits execution of the driving control of the first controller 120 and the second controller 160 to be described below when at least one of the host vehicle M or the occupant has the execution authority of the driving control in the embodiment, and prohibits the execution of the driving control when the at least one of the host vehicle M or the occupant does not have the execution authority.

When both the host vehicle M and the occupant do not have the execution authority, the executability determiner 110 may output that prior registration (charging) with the management server SV is required, from the HMI 30 via the HMI controller 180, and notify the occupant of that. The executability determiner 110 may cause the HMI controller 180 to provide an interface allowing the HMI 30 to directly perform a registration procedure with the management server SV. The executability determiner 110 may permit the execution of all driving controls, which will be described below, when both the host vehicle M and the occupant have the execution authority, and limit types of executable driving controls when only one of the host vehicle M and the occupant has the execution authority.

The executability determiner 110 may determine whether or not the management server SV has the execution authority when the host vehicle M is in operation (for example, when the ignition is turned on), and store the executability obtained from the management server SV in the storage 190 as the authority information 192. Accordingly, the executability determiner 110 does not have to inquire of the management server SV each time the host vehicle M operates, and can easily determine whether or not the host vehicle M can execute the driving control by referring to the authority information 192 stored in the storage 190. In the following description, the executability determiner 110 determines that the host vehicle M or the occupant M has the authority to execute the driving control of the embodiment.

Figure 2:
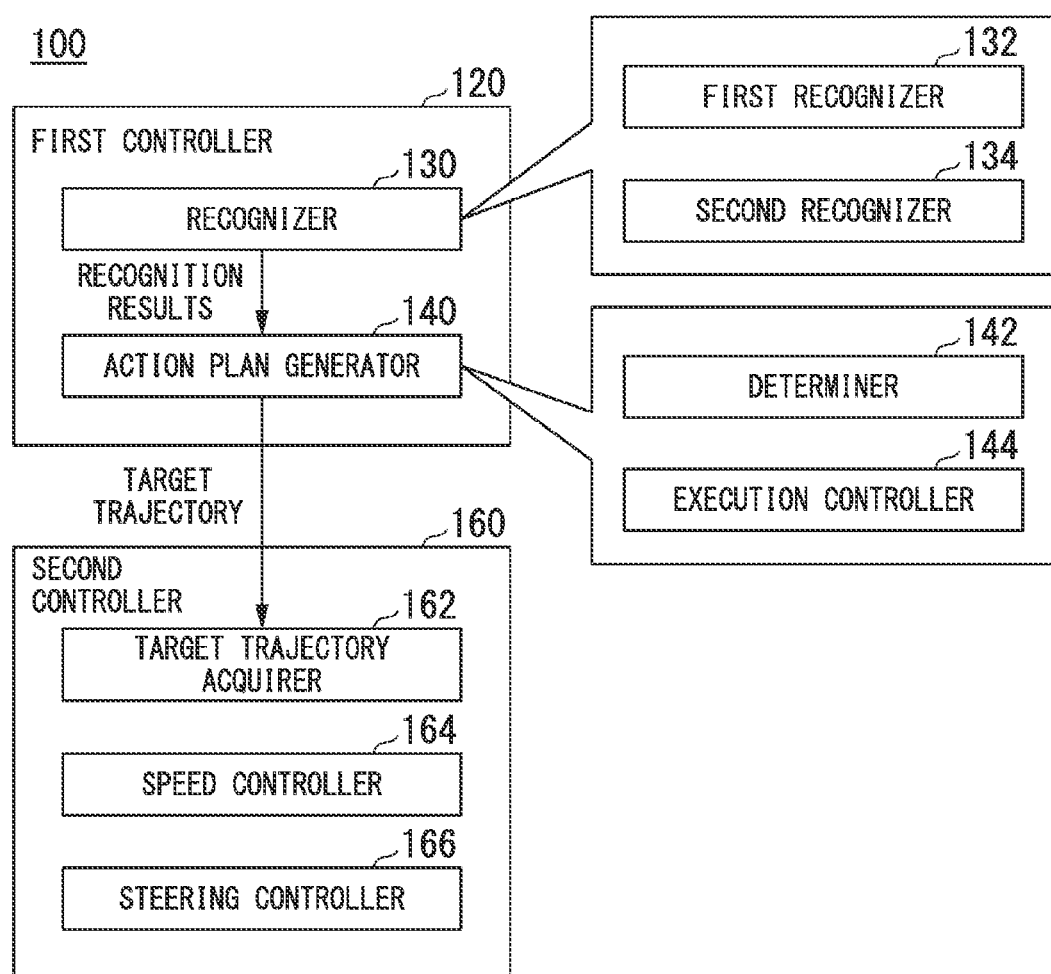
FIG. 2 is a functional configuration diagram of a first controller and a second controller.

FIG. 2 is a functional configuration diagram of the first controller 120 and the second controller 160. The first controller 120 includes, for example, a recognizer 130 and an action plan generator 140. The action plan generator 140 and the second controller 160 are examples of a "driving controller". The first controller 120, for example, realizes a function using artificial intelligence (AI) and a function using a model given in advance in parallel. For example, a function of "recognizing intersections" may be realized by recognition of the intersection using deep learning or the like and recognition based on previously given conditions (there is a signal which can be subjected to pattern matching, a road sign, or the like) being executed in parallel and scored for comprehensive evaluation. This ensures the reliability of the automated driving. The first controller 120 executes control regarding the automated driving of the host vehicle M on the basis of instructions from the MPU 60, the HMI controller 180, and the like, for example.

The recognizer 130 recognizes the surrounding situation of the host vehicle M on the basis of a recognition result of the detection device DD (information input from the camera 10, the radar device 12, and the LIDAR 14 via the object recognition device 16). For example, the recognizer 130 recognizes a state such as a position, speed, and acceleration of objects present around the host vehicle M. The position of the object is recognized, for example, as a position on absolute coordinates with a representative point (a centroid, a center of a drive shaft, or the like) of the host vehicle M as an origin, and used for control. The position of the object may be represented by a representative point such as a centroid or a corner of the object, or may be represented by a represented area. For example, when the object is a mobile object such as another vehicle, the "state" of the object includes acceleration, jerk, or a "behavior state" (for example, the other vehicle is changing lanes or is about to change lanes) of the mobile object.

The recognizer 130 includes, for example, a rust recognizer 132 and a second recognizer 134. Details of these functions will be described below.

The action plan generator 140 generates an action plan that causes the host vehicle M to travel through automated driving. For example, the action plan generator 140 generates a target trajectory along which the host vehicle M can basically travel in the recommended lane determined by the recommended lane determiner 61 and the host vehicle M will travel in the future automatically (without depending on an operation of a driver) so that the host vehicle M will cope with a surrounding situation of the host vehicle M, on the basis of, for example, shapes of surrounding roads based on a current position of the host vehicle M acquired from a recognition result of the recognizer 130 or the map information. The target trajectory includes, for example, a speed element. For example, the target trajectory is represented as a sequence of points (trajectory points) to be reached by the host vehicle M. The trajectory point is a point that the host vehicle M is to reach for each predetermined traveling distance (for example, several meters) along a road, and a target speed and a target acceleration at every predetermined sampling time (for example, every several tenths of a [sec]) are separately generated as a part of the target trajectory. The trajectory point may be a position to be reached by the host vehicle M at the sampling time at every predetermined sampling time. In this case, information on the target speed or the target acceleration is represented by an interval between the trajectory points.

The action plan generator 140 may set an automated driving event when generating the target trajectory. Examples of the event include a constant-speed traveling event in which the host vehicle M is caused to travel in the same lane at a constant speed, a following traveling event in which the host vehicle M is caused to follow another vehicle present within a predetermined distance (for example, within 100 m) in front of the host vehicle M and closest to the host vehicle M, a lane change event in which the host vehicle M is caused to perform lane change from the host lane to an adjacent lane, a branching event in which the host vehicle M is caused to branch to a lane on the destination side at a branch point of a road, a merging event in which the host vehicle M is caused to merge with a main lane at a merging point, and a takeover event for ending automated driving and performing switching to manual driving. Examples of the events may include an overtaking event in which the host vehicle M is first caused to change lanes into an adjacent lane, overtake a preceding vehicle in the adjacent lane, and then, change the lanes again to an original lane, and an avoidance event in which the host vehicle M is caused to perform at least one of braking and steering in order to avoid an obstacle present in front of the host vehicle M.

The action plan generator 140, for example, may change an event already determined for a current section to another event, or set a new event for the current section, according to a surrounding situation of the host vehicle M recognized when the host vehicle M is traveling. The action plan generator 140 may change the event already set for the current section to another event, or set a new event for the current section, according to an operation of the occupant with respect to the HMI 30. The action plan generator 140 generates a target trajectory according to the set event.

The action plan generator 140 includes, for example, a determiner 142 and an execution controller 144. Details of these functions will be described below.

The second controller 160 controls the travel driving force output device 200, the brake device 210, and the steering device 220 so that the host vehicle M passes through the target trajectory generated by the action plan generator 140 at a scheduled time.

The second controller 160 includes, for example, a target trajectory acquirer 162, a speed controller 164, and a steering controller 166. The target trajectory acquirer 162 acquires information on the target trajectory (trajectory points) generated by the action plan generator 140 and stores the information on the target trajectory in a memory (not shown). The speed controller 164 controls the travel driving force output device 200 or the brake device 210 on the basis of a speed element incidental to the target trajectory stored in the memory. The steering controller 166 controls the steering device 220 according to a bent state of the target trajectory stored in the memory. Processing of the speed controller 164 and the steering controller 166 is realized by, for example, a combination of feedforward control and feedback control. For example, the steering controller 166 executes a combination of feedforward control according to a curvature radius (or curvature) of a road in front of the host vehicle M with feedback control based on a deviation from the target trajectory.

Referring back to FIG. 1, the HMI controller 180 uses the HMI 30 to notify the occupant of predetermined information. Examples of the predetermined information include information related to traveling of the host vehicle M, such as information on a state of the host vehicle M or information on driving control. Examples of the information on the state of the host vehicle M include a speed of the host vehicle M, an engine speed, and a shift position. The information on the driving control includes, for example, whether or not driving control is executed by automated driving, information for inquiring about whether to start automated driving, information on a driving control situation through automated driving, information on an automation level, information for requesting the occupant to perform driving when switching from automated driving to manual driving occurs, and the like. The predetermined information may include information not related to the traveling of the host vehicle M, such as TV programs and content (for example, movies) stored in a storage medium such as a DVD. The predetermined information may include, for example, information on a current position, a destination, and a remaining amount of fuel of the host vehicle M in the automated driving. The HMI controller 180 may output information received by the HMI 30 to the communication device 20, the navigation device 50, the first controller 120, and the like.

The HMI controller 180 may cause the HMI 30 to output information on inquiry of the occupant or a determination result by the executability determiner 110. The HMI controller 180 may transmit various types of information to be output by the HMI 30, to a terminal device that is used by a user of the host vehicle M via the communication device 20.

The travel driving force output device 200 outputs a travel driving force (torque) for traveling of the vehicle to driving wheels. The travel driving force output device 200 includes, for example, a combination of an internal combustion engine, an electric motor, a transmission, and the like, and an electronic control unit (ECU) that controls these. The ECU controls the above configuration according to information input from the second controller 160 or information input from the accelerator pedal of the driving operator 80.

The brake device 210 includes, for example, a brake caliper, a cylinder that transfers hydraulic pressure to the brake caliper, an electric motor that generates hydraulic pressure in the cylinder, and a brake ECU. The brake ECU controls the electric motor according to the information input from the second controller 160 or the information input from a brake pedal of the driving operator 80 so that a brake torque according to a braking operation is output to each wheel. The brake device 210 may include a mechanism that transfers the hydraulic pressure generated by an operation of the brake pedal to the cylinder via a master cylinder, as a backup. The brake device 210 is not limited to the configuration described above and may be an electronically controlled hydraulic brake device that controls an actuator according to the information input from the second controller 160 and transfers the hydraulic pressure of the master cylinder to the cylinder.

The steering device 220 includes, for example, a steering ECU and an electric motor. The electric motor, for example, changes directions of steerable wheels by causing a force to act on a rack and pinion mechanism. The steering ECU drives the electric motor according to the information input from the second controller 160 or the information input from a steering wheel of the driving operator 80 to change the directions of the steerable wheels.

[Recognizer and Action Plan Generator]

Next, details of functions of the recognizer 130 (the first recognizer 132 and the second recognizer 134) and the action plan generator 140 (the determiner 142 and the execution controller 144) will be described. Hereinafter, content of the driving control mainly performed by the execution controller 144 will be divided into several scenes and described.

[First Scene]

Figure 3:
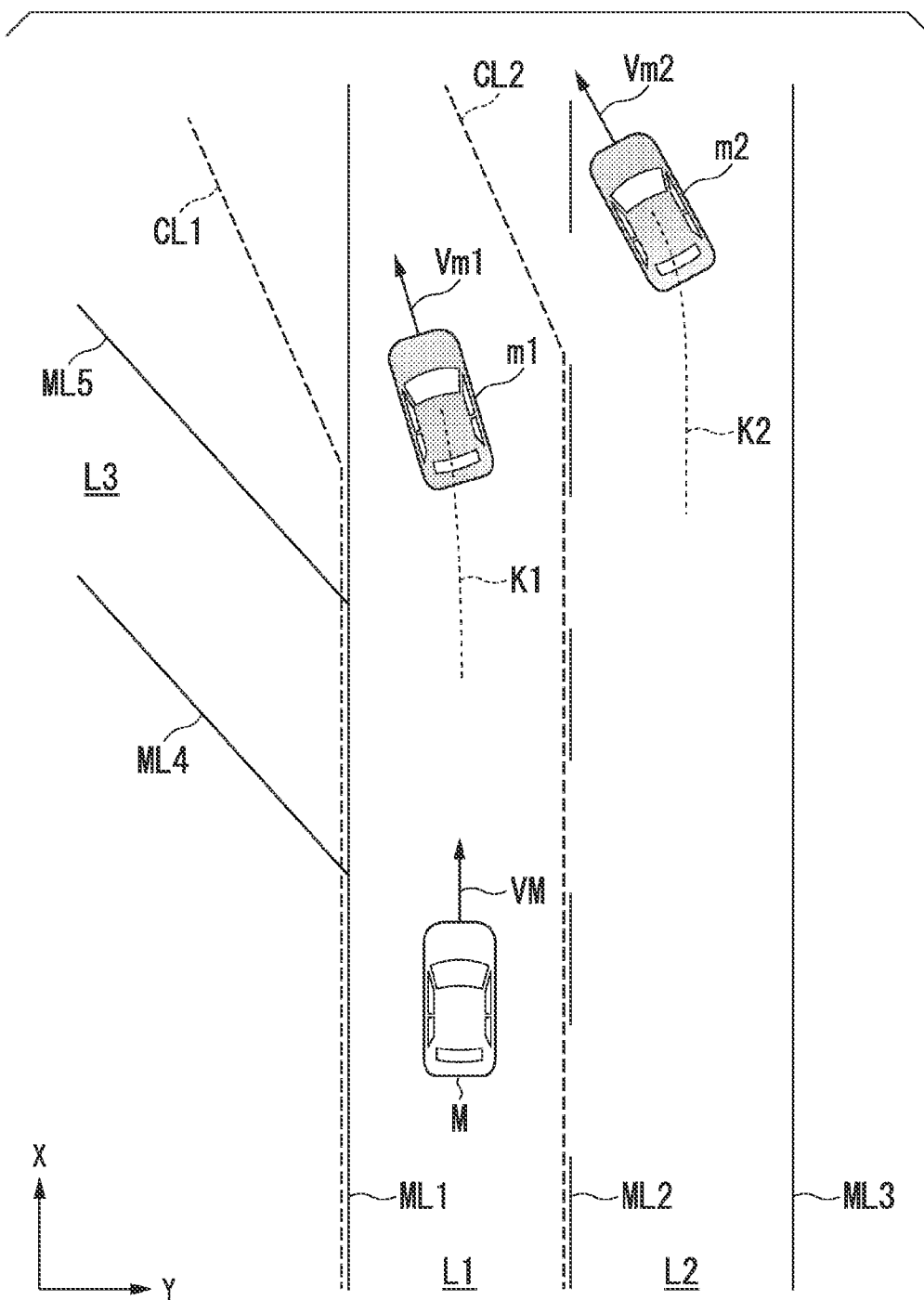
FIG. 3 is a diagram illustrating driving control in a first scene.

FIG. 3 is a diagram illustrating driving control in a first scene. The first scene is, for example, a scene in which the host vehicle M travels in a lane change section (for example, a section including lane increase and decrease) such as a branch section or a merging section, and there is another vehicle in each of the lane in which the host vehicle M is traveling and an adjacent lane thereof in front of the host vehicle M (within a predetermined distance). In the following description, the branch section is used as an example of the lane change section. In the first scene, it is assumed that the host vehicle M travels on a main line of the branch section and LKAS control is being performed. The same applies to second and third scenes to be described below.

In the example of FIG. 3, partition lines CL1 and CL2 recognized by the detection device DD, and partition lines ML1 to ML5 obtained from the map information (for example, the second map information 62) on the basis of positional information of the host vehicle M are shown. In the map information, a lane L1 is partitioned by partition lines ML1 and ML2, a lane L2 is partitioned by partition lines ML2 and ML3, and a lane L3 is partitioned by partition lines ML4 and ML5. The lanes L1 and L2 can extend in the same direction (X-axis direction), and the lane L3 is a branch lane when the lanes L1 and L2 are main lanes. In FIG. 3, it is assumed that the host vehicle M is traveling in the lane L1 at a speed VM, the other vehicle m1 is traveling in the lane L1 at a speed Vm1 in front in the traveling lane of the host vehicle M, and the other vehicle m2 is traveling in the lane L2 that is a lane adjacent to the lane L1 at a speed Vm2 in front of the host vehicle M. The partition lines CL1 and CL2 are examples of a "first partition line." The partition lines ML1 to ML5 are examples of a "second partition line."

The first recognizer 132 recognizes a surrounding situation of the host vehicle M on the basis of an output of the detection device DD that has detected the surrounding situation of the host vehicle. For example, the first recognizer 132 recognizes the left and right partition lines CL1 and CL2 that divide the travel lane of the host vehicle M on the basis of images captured by the camera 10 (hereinafter, camera images). Hereinafter, the partition lines CL1 and CL2 may be referred to as "camera partition lines CL1 and CL2". For example, the first recognizer 132 analyzes the camera image, extracts edge points having a large luminance difference from adjacent pixels in the image, and connects the edge points to recognize the camera partition lines CL1 and CL2 on an image plane. The first recognizer 132 converts positions of the camera partition lines CL1 and CL2 with reference to a position of the representative point of the host vehicle M, into a vehicle coordinate system (for example, an XY plane coordinates in FIG. 3). The first recognizer 132 may recognize, for example, a curvature radius or curvature of the camera partition lines CL1 and CL2. The first recognizer 132 may recognize a curvature change amount of the camera partition lines CL1 and CL2. The curvature change amount is, for example, a rate of temporal change in curvature of the camera partition lines CL1 and CL1 recognized by the camera 10 at X [m] in front of the host vehicle M when viewed from the host vehicle M. The first recognizer 132 may average the curvature radius, curvature, or curvature change amount of each of the camera partition lines CL1 and CL2 to recognize a curvature radius, curvature, or curvature change amount of the lane partitioned by the camera partition lines CL1 and CL2. The camera partition lines CL1 and CL2 may be recognized or corrected on the basis of the output of the detection device other than the camera 10.

The first recognizer 132 recognizes other vehicles present around the host vehicle M. For example, the first recognizer 132 detects another vehicle (front traveling vehicles) traveling within a predetermined distance from the host vehicle M in front of the host vehicle M, on the basis of the output of the detection device DD that has detected the surrounding situation of the host vehicle M. The front traveling vehicle may include, for example, one or both of a preceding vehicle traveling in the same lane as the host vehicle M and a parallel traveling vehicle traveling in an adjacent lane in the same direction as the traveling lane of the host vehicle M. When there are a plurality of preceding vehicles (or parallel traveling vehicles), a nearest preceding vehicle (or parallel traveling vehicle) from the host vehicle M may be recognized. The preceding vehicle is an example of a "first other vehicle". The parallel traveling vehicle is an example of a "second other vehicle."

In the example of FIG. 3, the first recognizer 132 recognizes other vehicles m1 and m2 as front traveling vehicles. The first recognizer 132 recognizes positions (relative positions with respect to host vehicle M) and speeds (relative speed with respect to host vehicle M) of the other vehicles m1 and m2, or recognizes traveling lanes of the other vehicles m1 and m2. The first recognizer 132 recognizes traveling positions of the other vehicles m1 and m2 on respective traveling lanes. The first recognizer 132 may recognize traveling position information of the other vehicles m1 and m2. The traveling position information is, for example, traveling trajectories K1 and K2 with reference to positions when the other vehicles m1 and m2 are traveling at respective representative points at a predetermined time. The first recognizer 132 may recognize a curvature radius, a curvature, or a curvature change amount of each of the traveling trajectories K1 and K2.

The second recognizer 134 recognizes partition lines of a lane around the host vehicle M (within a predetermined distance) from the map information on the basis of the position of the host vehicle M detected by the vehicle sensor 40 or the GNSS receiver 51, for example. For example, the second recognizer 134 refers to the map information on the basis of position information of the host vehicle M to recognize the partition line ML to ML5 present in a direction in which the host vehicle M travels or a direction in which the host vehicle M can travel. Hereinafter, the partition lines ML1 to ML5 may be referred to as "map partition lines ML1 to ML5".

The second recognizer 134 may recognize the map partition lines ML1 and ML2 as partition lines that partition the traveling lane of the host vehicle M among the recognized map partition lines ML1 to ML5. The second recognizer 134 recognizes a curvature radius, curvature, or curvature change amount of each of the map partition lines ML1 to ML5 from the second map information 62. The second recognizer 134 may average the curvature radius, curvature, or curvature change amount of each of the map partition lines ML1 to ML5, to recognize a curvature radius, curvature, or curvature change amount of a lane partitioned by the map partition lines.

The determiner 142 determines whether or not the camera partition lines CL1 and CL2 recognized by the first recognizer 132 match the map partition lines ML1 and ML2 recognized by the second recognizer 134. For example, the determiner 142 derives a degree of matching between the left closest partition line CL1 viewed from the host vehicle M and ML1, and a degree of matching between the right closest partition line CL2 viewed from the host vehicle M and ML2. The determiner 142 determines that the camera partition line matches the map partition line when the derived matching degree is equal to or greater than a threshold value, and determines that the camera partition line does not match the map partition line when the derived matching degree is smaller than the threshold value. A determination of whether or not the camera partition line matches the map partition line is repeatedly executed at a predetermined timing or cycle.

For example, the determiner 142 superimposes the camera partition lines CL1 and CL2 and superimposes the map partition lines ML1 and ML2 with reference to the position of the representative point of the host vehicle M on the plane (XY plane) of the vehicle coordinate system. When the determiner 142, for example, determines comparison target partition lines (the partition lines CL1 and ML1, and the partition lines CL2 and ML2), the determiner 142 determines that the partition lines match when the degree of matching between the partition lines is equal to or greater than the threshold value, and determines that the partition lines do not match when the degree of matching between the partition lines is smaller than the threshold value. The matching means, for example, that a lateral position (for example, a Y-axis direction in the figure) divergence (for example, an amount of deviation of the lateral position) is small. The divergence may be, for example, a difference between curvature change amounts of the partition lines or an angle formed by the two comparison target partition lines, or may be a combination thereof. The determiner 142 may perform the determination using only one of the degree of matching between the partition lines CL1 and ML1 and the degree of matching between the partition lines CL2 and ML2. It is possible to reduce a processing load in a case in which the match determination is made using only one of the degrees of matching as compared with a case in which the match determination is made using both of the degrees of matching. It is possible to improve determination accuracy by making the match determination using both of the degrees of matching.

The execution controller 144 determines the driving control to be executed by the driving controller (the action plan generator 140 or the second controller 160) on the basis of a determination result of the determiner 142, and executes the determined driving control. "To determine the driving control" may include to determine the content (type) of the driving control or to determine whether to execute (curb) the driving control. "To execute the driving control" may include to continue the driving control that is already being executed, in addition to switching and executing the driving control. To curb the driving control may include not only not to execute the driving control, but also to lower the automation level of the driving control.

Here, in the first scene, the driving control executed by the execution controller 144 includes at least first driving control and second driving control. The first driving control is driving control for executing at least steering control out of steering and speed of the host vehicle M, on the basis of the partition line recognized by the first recognizer 132 or the second recognizer 134 (for example, a partition line in a portion in which the camera partition line matches the map partition line). For example, the first driving control is driving control for causing the host vehicle M to travel so that the representative point of the host vehicle M passes through a center of the lane partitioned by the partition line. The second driving control is, for example, driving control for executing at least steering control out of the steering and the speed of the host vehicle M on the basis of the camera partition line recognized by the first recognizer 132 and traveling position information of the front traveling vehicle. The second driving control is, for example, driving control for causing the host vehicle M to travel so that the representative point of the host vehicle M travels on a trajectory along the camera partition lines having shapes matching the traveling trajectories K1 and K2 of the other vehicles m1 and m2 among a plurality of camera partition lines.

Further, the driving control may include third driving control for executing at least steering control out of the steering and the speed of the host vehicle M while giving priority to the camera partition line over the map partition line, or fourth driving control for executing at least the steering control out of the steering and the speed of the host vehicle M while giving priority to the map partition line over the camera partition line. Giving priority to the camera partition line over the map partition line means, for example, processing based on the camera partition line is basically performed, but switching to processing based on the map partition line temporarily occurs when recognition accuracy of the camera partition line is lower than a threshold value or the camera partition line cannot be recognized. Giving priority to the map partition line over the camera partition line means basically performing processing based on the map partition line, but for example, the map partition line cannot be specified or switching to the processing based on the camera partition line temporarily occurs. The third driving control or the fourth driving control is, for example, driving control when the camera partition line does not match the map partition line.

The driving control may include a plurality of driving controls with different automation levels (an example of a degree of automation). The automation levels include, for example, a first level, a second level with a lower degree of the automation of the driving control than the first level, and a third level with a lower degree of the automation of the driving control than the second level. The automation level may include a fourth level (an example of a fourth degree of control) with a lower degree of the automation of the driving control than the third level. Here, the automation level may be a level determined by standardized information, regulations, or the like, or may be an index value that is set independently of the standardized information, regulations, or the like. Therefore, the type, content, and number of automation levels are not limited to the following examples. A low degree of the automation of the driving control means, for example, that an automation rate in the driving control is low and the task imposed on the driver is large (severe). Low automation of the driving control means that a degree at which the automated driving control device 100 controls the steering or acceleration or deceleration of the host vehicle M is low (a degree at which the driver needs to intervene in a steering or acceleration or deceleration operation is high). The task imposed on the driver includes, for example, monitoring the surroundings of the host vehicle M or operating the driving operator. An operation with respect to the driving operator includes, for example, a state in which the driver grips the steering wheel (hereinafter, a hands-on state). A task imposed on the driver is, for example, a task (driver task) for an occupant necessary for maintenance of automated driving of the host vehicle M. Therefore, when the occupant cannot execute the imposed task, the automation level is lowered. For example, the driving control at the first level may include driving control such as ACC, ALC, LKAS, and TJP. The driving control at the second or third level may include, for example, driving control such as ACC, ALC, and LKAS. Driving control at the fourth level may include manual driving. For driving control at the fourth level, for example, driving control such as ACC may be executed. Among the first to fourth levels, the first level has a highest degree of automation of the driving control, and the fourth level has a lowest degree of automation of the driving control.

There is no task imposed on the occupant at the first level (the task imposed on the driver is the lightest). A task imposed to the occupant at the second level is, for example, monitoring surroundings (especially, the forward side) of the vehicle M. A task imposed on the occupant at the third level includes, for example, being in a hands-on state, in addition to monitoring the surroundings of the vehicle M. A task imposed on the occupant (for example, a driver) at the fourth level is, for example, an operation for controlling the steering and speed of the vehicle M using the driving operator 80, in addition to monitoring the surroundings and being in the hands-on state of the vehicle M. That is, in the case of the fourth level, the occupant can immediately take over driving, and the task imposed on the driver is the most severe. The content of the driving control and the tasks imposed on the occupant at each automation level are not limited to the examples described above. The automated driving control device 100 executes the driving control at any one of the first to fourth levels on the basis of the surrounding situation of the vehicle M or the task being executed by the occupant.

For example, the execution controller 144 executes the first driving control when the determiner 142 determines that the camera partition line matches the map partition line, and executes the second driving control when the determiner 142 determines that the camera partition line does not match the map partition line. Hereinafter, the second driving control will be mainly described concretely.

When the execution controller 144 executes the second driving control, the execution controller 144 determines that a shape of the traveling trajectories K1 and K2 of the other vehicles m1 and m2 matches a shape of the camera partition line in a predetermined section in front of the host vehicle M. In this case, the execution controller 144 determines that the shapes of the traveling trajectories K1 and K2 match the shape of the camera partition line when a degree of matching between the shapes of the traveling trajectories K1 and K2 and the shape of the camera partition line is equal to or greater than a threshold value, and determines that the shapes of the traveling trajectories K1 and K2 do not match the shape of the camera partition line when the degree of matching is smaller than the threshold value. The degree of shape matching does not include, for example, a degree of matching between positions of the comparison targets (traveling trajectories K1 and K2 and the camera partition lines CL1 and CL2), and is derived on the basis of curvature radii (curvatures or curvature change amounts) thereof or the amount of change in distance in a predetermined section of the comparison target, and when the curvature radii are closer and/or the amount of change in distance is smaller, the degree of shape matching increases. The degree of shape matching may be derived from an angle formed by two comparison target partition lines instead of (or in addition to) the curvature radius or the amount of change in distance. In this case, when the angle smaller, the degree of shape matching is higher. The execution controller 144 may finally determine whether or not the shapes match depending on an average (excluding an outlier) of a degree of matching of the comparison targets (for example, the traveling trajectory K1 and the camera partition line CL1, and the traveling trajectory K2 and the camera partition line CL2) in a predetermined section, a majority decision of individual matching determination results, or the like. In the case of the majority decision, a determination is made that the shapes match, for example, when the number of matches is larger than the number of non-matches when a plurality of comparison targets are compared.

When a determination is made that the traveling trajectories K1 and K2 match the camera partition lines CL1 and CL2, the execution controller 144 determines that the other vehicles m1 and m2 are traveling in travel directions of the lanes L1 and L2, and executes the second driving control for causing the host vehicle M to travel on the basis of the camera partition lines CL1 and CL2. Thus, it is possible to improve the reliability of the travel lane of the host vehicle M or the reliability of the camera partition line by using not only the traveling trajectory K1 of the other vehicle m1, which is a preceding vehicle, but also the traveling trajectory K2 of the other vehicle m2, which is a parallel traveling vehicle. It is possible to continue driving control such as LKAS and further improve control continuity. Since the other vehicles m1 and m2 are less likely to change lanes at the same time, it is possible to more appropriately perform a more appropriate determination as to whether or not the recognition of the camera partition lines is correct, and switching between driving controls based on determination results by using the respective traveling trajectories K1 and K2.

In the first scene, the execution controller 144 may curb the driving control when at least one of the other vehicles m1 and m2 cannot be recognized or when the other vehicles m1 and m2 can be recognized but at least one of the traveling trajectories K1 and K2 cannot be recognized. The execution controller 144 may curb the driving control because at least one of the traveling trajectories K1 and 2 is highly likely to be erroneously recognized when a distance between the traveling trajectories K1 and K2 is equal to or greater than a first predetermined distance (when the traveling trajectories K1 and K2 are too far away) or smaller than a second predetermined distance smaller than the first predetermined distance (when the traveling trajectories K1 and K2 are too close), even when the degree of shape matching between the traveling trajectories K1 and K2 and the camera partition lines CL1 and CL2 is equal to or greater than the threshold value.

In a case in which the shape of at least one of the traveling trajectories K1 and K2 matches the shape of the camera partition lines CL1 and CL2 (the degree of matching is equal to or greater than the threshold value) even when the shapes of the traveling trajectories K1 and K2 do not match, the execution controller 144 may execute the driving control (second driving control) based on the camera partition line on the shape match side, and curb the driving control when the shapes do not match. This makes it possible to determine whether or not the partition line recognized by the first recognizer 132 is correct using the traveling trajectories K1 and K2, and continue the driving control on the basis of the partition lines or positions of other vehicles recognized by the first recognizer 132.

The execution controller 144 may execute the second driving control when the first recognizer 132 recognizes the other vehicles m1 and m2 (traveling trajectories K1 and K2) within a first predetermined period of time (that is, a timing at which the first recognizer 132 has recognized the other vehicles m1 and m2 within the first predetermined period of time) in addition to the above-described conditions, and may not execute the second driving control (may execute control other than the first driving control and the second driving control) when the first recognizer 132 does not recognize the other vehicles m1 and m2 within the first predetermined period of time. This makes it possible to more reliably avoid contact with an object on a travel path since the driving control is continuously executed.

Although the execution controller 144 continues the second driving control on the basis of a result of the determination using the traveling trajectories K1 and K2 when a determination is made that the camera partition line does not match the map partition line, the execution controller 144 may continue the second driving control without transition to other driving control until a predetermined time elapses from the start of the execution of the second driving control even when a determination is made that the camera partition line matches the map partition line later. This makes it possible to curb frequent switching of the driving control and further stabilize the driving control. The execution controller 144 may end the second driving control when a predetermined time has elapsed after execution of the second driving control is started on the basis of results of the determination using the traveling trajectories K1 and K2 (or when the host vehicle M has traveled a predetermined distance) in a state in which a determination is made that the camera partition line does not match the map partition line. This makes it possible to curb the driving control being continued for a long time in a state in which a determination is made that the camera partition line does not match the map partition line. In this case, the execution controller 144 may perform switching to manual driving, or may execute control for lowering the automation level of the driving control from a current level. The execution controller 144 may set a condition that the host vehicle M travels a predetermined distance or longer instead of (or in addition to) the elapse of the predetermined time described above.

According to the first scene described above, even when the camera partition line does not match the map partition line in the lane change section, it is possible to execute more appropriate driving control by determining the content of the driving control using the traveling trajectory of the front traveling vehicle. Therefore, it is possible to improve the continuity of the driving control (for example, LKAS control). In the first scene, it is possible to more accurately estimate change in the entire travel path by using the traveling trajectories of both the preceding vehicle and the parallel traveling vehicle.

[Second Scene]

Next, the second scene will be described. The second scene is, for example, a scene in which there is a preceding vehicle (first other vehicle) among front traveling vehicles, but there is no parallel traveling vehicle (second other vehicle), unlike the first scene. In this case, the execution controller 144 determines whether or not the second driving control can be executed on the basis of a positional relationship between the camera partition line and the map partition line and a vehicle width of the preceding vehicle. Hereinafter, the content different from the first scene will be mainly described, and description of the same processing as in the first scene will be omitted. The same applies to the third scene to be described below.

Figure 4:
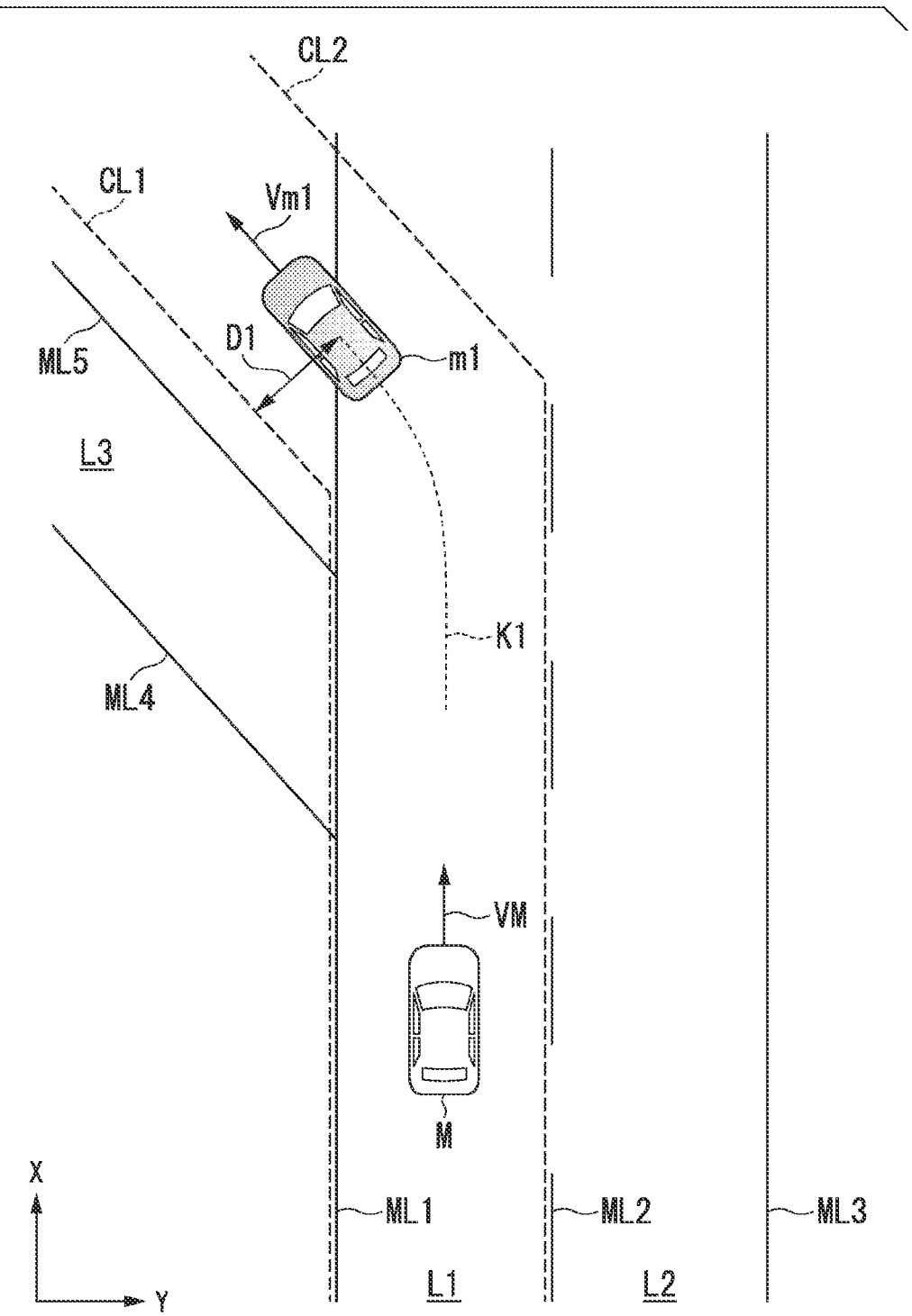
FIG. 4 is a diagram illustrating driving control in a second scene.

FIG. 4 is a diagram illustrating the driving control in the second scene. In the example of FIG. 4, the camera partition lines CL1 and CL2 recognized by the camera 10 included in the detection device DD and the map partition lines ML1 to ML5 recognized by referring to the map information on the basis of the position information of the host vehicle M are shown, as in FIG. 3. In FIG. 4, it is assumed that the host vehicle M is traveling on the lane L1 at the speed VM, and the other vehicle m1 is traveling on the lane L1 at the speed Vm1 in front of the host vehicle M.

In the second scene, the execution controller 144 executes the first driving control when the camera partition line matches the map partition line. When a determination is made that the lines do not match, the execution controller 144 determines the driving control to be executed on the basis of, for example, a positional relationship between the camera partition lines CL1 and CL2 and the traveling trajectory K1 of the other vehicle m1.

For example, the execution controller 144 determines whether or not the traveling trajectory K1 of the other vehicle m1 is parallel to the camera partition lines CL1 and CL2. For example, the execution controller 144 determines that the camera partition lines CL1 and CL2 are parallel to the traveling trajectory K1 of the other vehicle m1 when an amount of change AD1 in a distance (shortest distance) D1 between the traveling trajectory K1 of the other vehicle m1 and the camera partition line CL1 is equal to or greater than a threshold value, and determines that the camera partition lines CL1 and CL2 are not parallel to the traveling trajectory K1 of the other vehicle m1 when the amount of change AD1 is smaller than the threshold value. The amount of change AD1 is, for example, an amount of change in a distance (lateral width) from the traveling trajectory K1 at respective points plotted at predetermined intervals in a direction in which the camera partition line CL1 extends in a section from the position of the host vehicle M to a predetermined process. The execution controller 144 may use a distance between the traveling trajectory K1 and the camera partition line CL2 instead of (or in addition to) the distance between the traveling trajectory K1 and the camera partition line CL1. The execution controller 144 may determine that the traveling trajectory K1 and the camera partition line CL1 (or CL2) are not parallel when the degree of shape matching between the traveling trajectory K1 and the camera partition line CL1 (or CL2) is equal to or greater than the threshold value, and determine that the traveling trajectory K1 and the camera partition line CL1 (or CL2) are not parallel when the degree of shape matching is smaller than the threshold value. When a determination is made that the traveling trajectory K1 and the camera partition line CL1 (or CL2) are parallel, the execution controller 144 executes the second driving control based on the camera partition lines that is a parallel target or the third driving control giving priority to the camera partition line over the map partition line, and curbs the execution of the driving control when a determination is made that the traveling trajectory K1 and the camera partition line CL1 (or CL2) are not parallel. Thus, in the second scene, even when the camera partition line does not match the map partition line, the driving control can be executed (continued) when the camera partition lines CL1 and CL2 are parallel to the traveling trajectory K1.

In the second scene, when a determination is made that the camera partition line does not match the map partition line, the execution controller 144 may determine the driving control to be executed, with respect to a positional relationship between the map partition line ML4 and ML5 of the branch lane 13 and the camera partition lines CL1 and CL2, and a position of the other vehicle m1. For example, the execution controller 144 determines whether or not the camera partition lines CL1 and CL2 are included in the branch lane L3. In this case, the execution controller 144 may determine whether at least one of the partition lines CL1 and CL2 is present in the lane L3. In the example of FIG. 4, both the partition lines CL1 and CL2 are not present within the branch lane L3. The other vehicle m1 is not traveling in the branch lane L3. When the execution controller 144 recognizes the above-described content, the execution controller 144 determines that the map partition lines ML4 and ML5 are incorrect (or the map partition lines ML4 and ML5 are not on the latest map), and executes the third driving control giving priority to the camera partition line over the map partition line. In this case, the execution controller 144 executes, for example, the driving control at the fourth level in the hands-on state.

Figure 5:
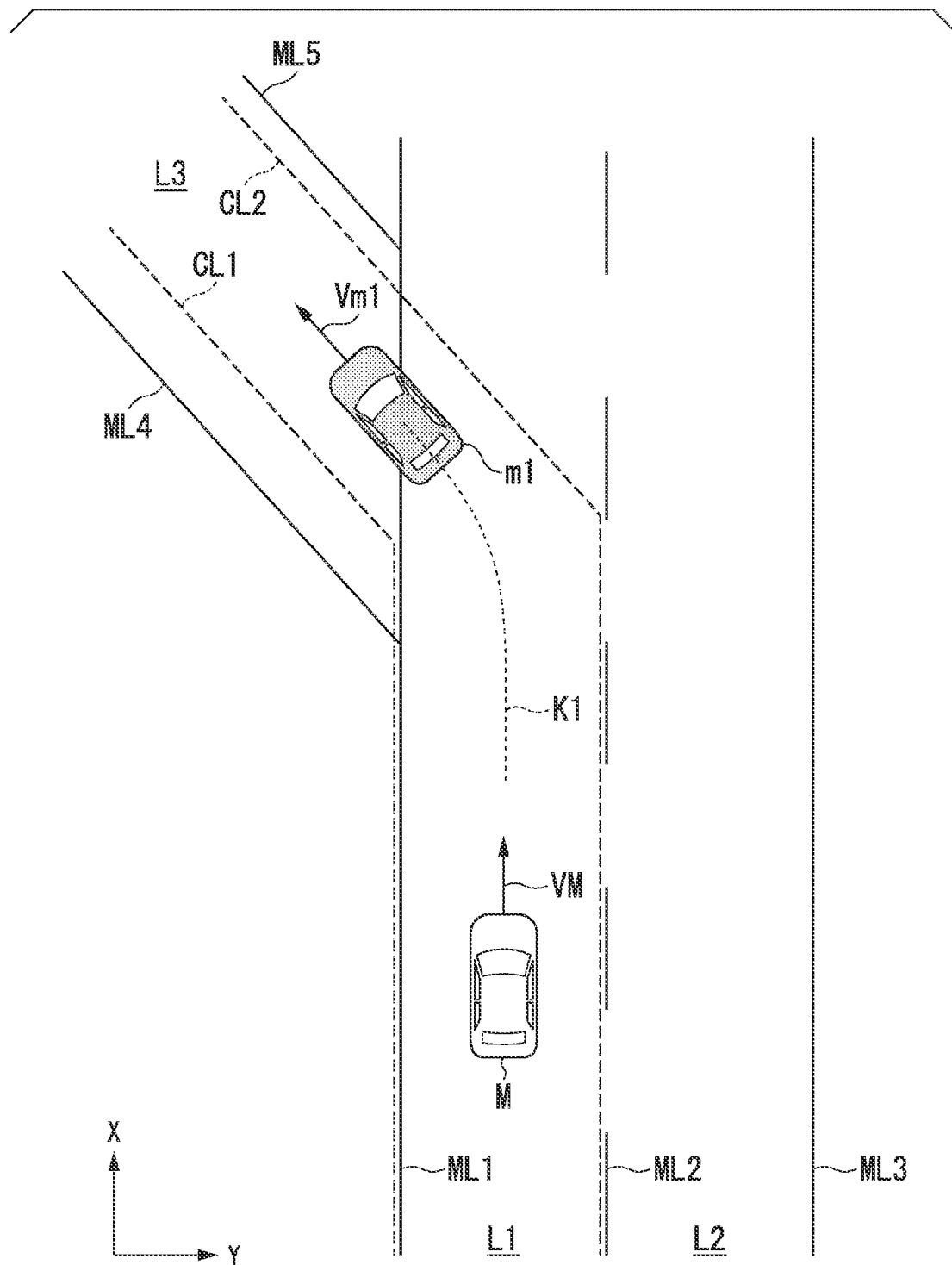
FIG. 5 is a diagram illustrating a case in which a camera partition line is present within a lane partitioned by map partition lines.

FIG. 5 is a diagram illustrating a case in which the camera partition line is present within the lane partitioned by the map partition lines. The example of FIG. 5 shows a scene in which the camera partition lines CL1 and CL2 do not match the map partition line ML4 and ML5, and both the camera partition lines CL1 and CL2 are present in the branch lane L3. In this case, a lane partitioned by the camera partition lines CL1 and CL2 is present in the branch lane L3, and the other vehicle m1 is likely to be traveling in a branching direction. Therefore, in this case, the execution controller 144 executes the driving control (the fourth driving control) giving priority to the map partition line over the camera partition line. In this case, the execution controller 144 executes, for example, driving control at the second level in a state in which the driver does not grip the steering wheel (hereinafter, a hands-off state).

Figure 6:
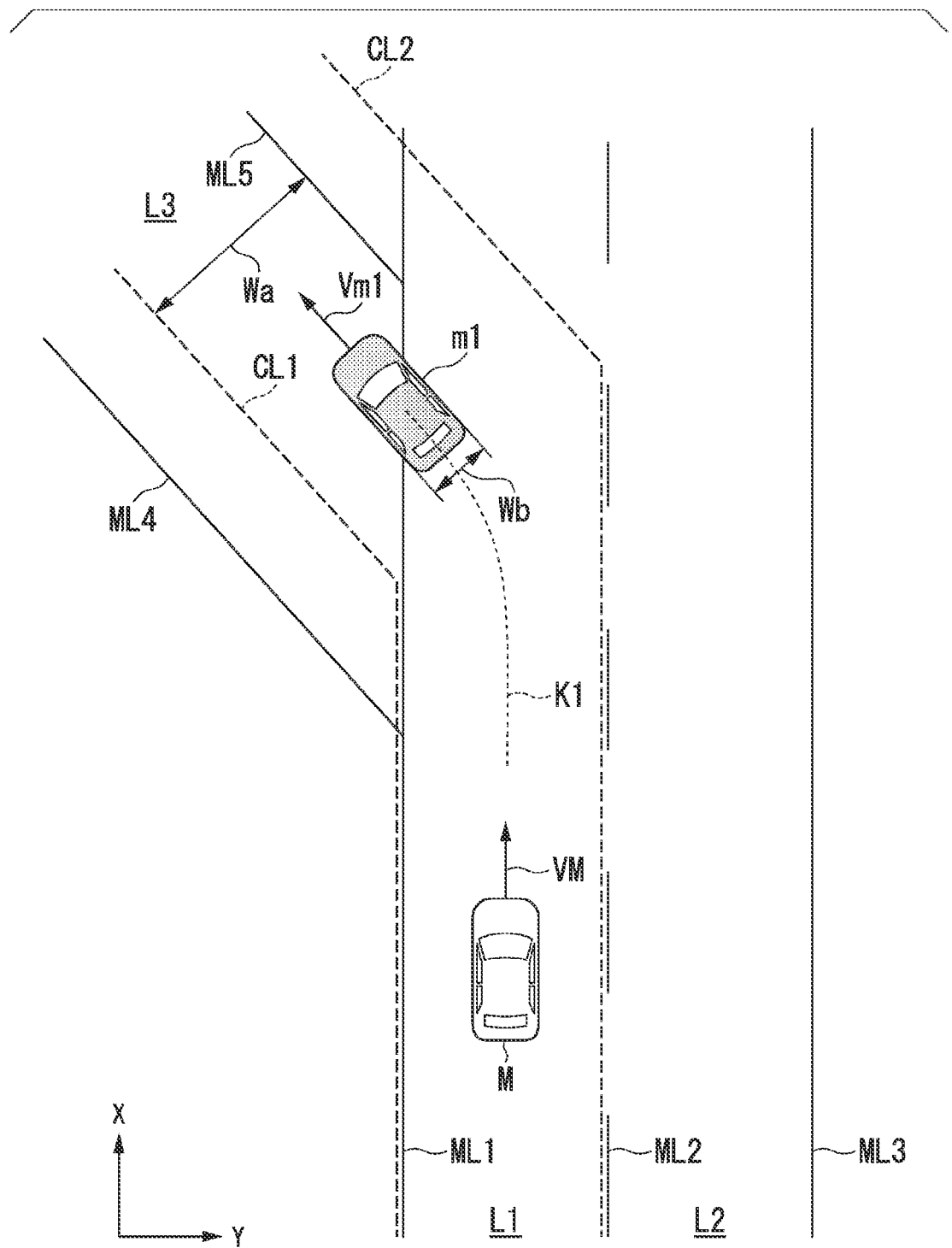
FIG. 6 is a diagram illustrating a case in which one of camera partition lines is present in a branch lane.

FIG. 6 is a diagram illustrating a case in which one of the camera partition lines CL1 and CL2 is present within the branch lane L3. In the example of FIG. 6, the partition line CL1 is present within the branch lane L3. In this case, it is not possible to determine whether the other vehicle m1 is traveling in the branch lane or is traveling in the lane partitioned by the partition lines CL1 and CL2 on the basis of only a positional relationship between the branch lane L3 and the partition lines CL1 and CL2. Therefore, the execution controller 144 determines driving control to be executed on the basis of a distance Wa between the camera partition line CL1 in the lane L3 and the map partition line ML5 present on the other vehicle m1 side when viewed from the camera partition line CL1 (present on the side overlapping the other vehicle m1) among the camera partition lines and the map partition line (more specifically, the map partition line extending along a traveling direction of the other vehicle m1) recognized by the first recognizer 132 and the second recognizer 134, and a vehicle width Wb of the other vehicle m1 acquired by communicating with the other vehicle m1 through a camera image or vehicle-to-vehicle communication. The distance Wa may be an average distance or a shortest distance in a predetermined section when the camera partition line CL1 and the map partition line CL2 do not extend in the same direction (when the camera partition line CL1 and the map partition line CL2 are not parallel). The vehicle width Wb may be obtained by adding a predetermined margin amount to an actual vehicle width of the other vehicle m1.

For example, when a determination is made that the distance Wa is not greater than the vehicle width Wb (the distance Wa is equal to or smaller than the vehicle width Wb (Wa≤Wb)), the execution controller 144 executes the third driving control giving priority to the camera partition line over the map partition line. In this case, the execution controller 144 executes, for example, the driving control at the fourth level in the hands-on state. When the execution controller 144 determines that the distance Wa is greater than the vehicle width Wb (Wa>Wb), the execution controller 144 executes driving control (the fourth driving control) giving priority to the map partition line over the camera partition line. In this case, the execution controller 144 executes, for example, the driving control at the second level in the hands-off state. The execution controller 144 may add a case in which the other vehicle m1 is present in the branch lane L3 to the condition, in addition to a case in which the execution controller 144 determines that the distance Wa is greater than the vehicle width Wb.

In the second scene, the execution controller 144 may determine whether or not an angle (a divergence angle) formed by the branch partition line and the camera partition line is equal to or greater than a predetermined angle before the execution controller 144 determines whether or not at least one of the camera partition lines CL1 and CL2 is present in the branch lane L3 when the camera partition line does not match the map partition line. When the execution controller 144 determines that the divergence angle is equal to or greater than the predetermined angle, the execution controller 144 executes the driving control (the third driving control) giving priority to the camera partition line over the map partition line. In this case, the execution controller 144 executes, for example, the driving control at the third or fourth level in the hands-on state. When a determination is made that the divergence angle is not equal to or greater than the predetermined angle, the execution controller 144 determines the driving control depending on whether at least one of the camera partition lines CL1 and CL2 is present in the branch lane L3, as described above.

In the second scene, the execution controller 144 may curb the driving control when there is no other vehicle m1, which is the preceding vehicle, and there is only a parallel traveling vehicle. The execution controller 144 may curb the driving control when the preceding vehicle becomes the parallel traveling vehicle by changing (moving) the other vehicle m1 from the lane L1 to the lane L2. This makes it possible to more appropriately execute (or curb) the driving control on the basis of the presence or absence or behavior of the front traveling vehicle.

In the second scene, the execution controller 144 may continue the driving control until a predetermined period elapses since the driving control is executed when the camera partition line matches the map partition line after the execution controller 144 executes the driving control. This makes it possible to curb frequent switching of the driving control and further stabilize the driving control. The execution controller 144 may end the driving control after a predetermined period of time has elapsed since the execution controller 144 has executed the driving control in a state in which a determination is made that the camera partition line does not match the map partition line. This makes it possible to curb the driving control being continued for a long time in a state in which a determination is made that the camera partition line does not match the map partition line. In this case, the execution controller 144 may perform switching to manual driving, or may execute control for lowering the automation level of the driving control from a current level. The execution controller 144 may set a condition that the host vehicle M travels a predetermined distance or longer instead of (or in addition to) the elapse of the predetermined time.

According to the second scene described above, even when the camera partition line does not match the map partition line in the lane change section, it is possible to continue the driving control (for example, LKAS control) and improve the continuity of driving control in a case in which the traveling trajectory of the preceding vehicle extends along the camera partition lines (a case in which the traveling trajectory and the camera partition line are parallel to each other and a case in which an amount of change in a distance between the traveling trajectory of the preceding vehicle and the camera partition line is smaller than a threshold value). It is possible to execute more appropriate driving control on the basis of an amount of deviation (including an angle of divergence) between the camera partition lines and the map partition line or a relationship with the vehicle width of the preceding vehicle.

[Third Scene]

Next, the third scene will be described. The third scene is, for example, a scene in which the camera partition line does not match the map partition line, and there is no front traveling vehicle in the vicinity (or there is only a parallel traveling vehicle) in a branch section including a branch lane. In this case, when the camera partition line does not match the map partition line, the execution controller 144 determines the driving control to be executed on the basis of one or both of the positional relationship between the camera partition line and the map partition line and an angle difference (divergence angle).

Figure 7:
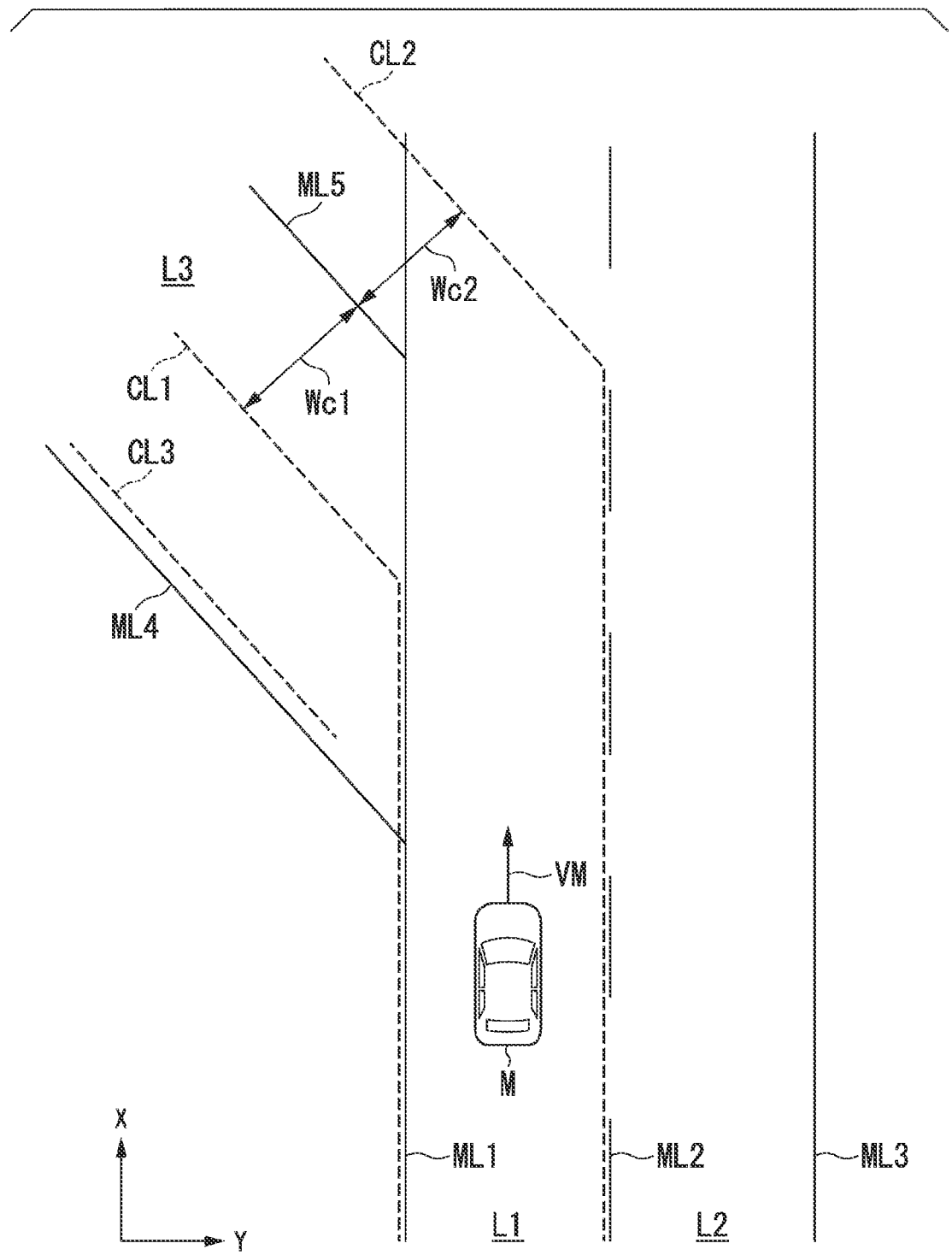
FIG. 7 is a diagram illustrating driving control in a third scene.

FIG. 7 is a diagram illustrating driving control in the third scene. In an example of FIG. 7, it is assumed that the first recognizer 132 recognizes the partition lines CL1 to CL3 as the camera partition lines, and the second recognizer 134 recognizes the partition lines ML1 to ML5 as the map partition lines.

In the example of FIG. 7, the determiner 142 determines whether or not the partition lines CL1 and ML1 or the partition lines CL2 and ML2 match each other. When the determiner 142 determines that the partition lines do not match and there is no front traveling vehicle, the execution controller 144 determines whether or not the map partition line ML5 present at a position away from the host vehicle M out of a pair of map partition lines ML4 and ML5 is present in a lane partitioned by a pair of camera partition lines CL1 and CL2 in a direction in which the traveling lane is branched (left side in the figure). When the map partition line ML5 is present within the lane defined by the camera partition lines CL1 and CL2, the execution controller 144 determines whether or not respective distances Wc1 and Wc2 between the camera partition lines CL1 and CL2 and the map partition line ML5 is equal to or greater than a predetermined distance Dth1. When the distances Wc1 and Wc2 are equal to or greater than the predetermined distance Dth1, and when another camera partition line CL3 is recognized in front of the host vehicle M from the camera partition line CL1 in the branching direction, the execution controller 144 executes the third driving control giving priority to traveling in the lane partitioned by the camera partition lines. The other camera partition line CL3 is an example of "another partition line". The execution controller 144 executes the third driving control when a distance from the map partition line ML4 closest to the camera partition line CL3 is smaller than a threshold value, in addition to the camera partition line CL3 being recognized.

When one of the distances Wc and Wc2 is smaller than the predetermined distance Dth1 and the camera partition line CL3 is not recognized, the execution controller 144 performs the fourth driving control giving priority to traveling in a lane partitioned by the map partition line ML4 and ML5. This makes it possible to execute (continue) the driving control on the basis of a positional relationship between or a recognition situation of the partition lines even when the camera partition line does not match the map partition line and there is no front traveling vehicle.

Figure 8:
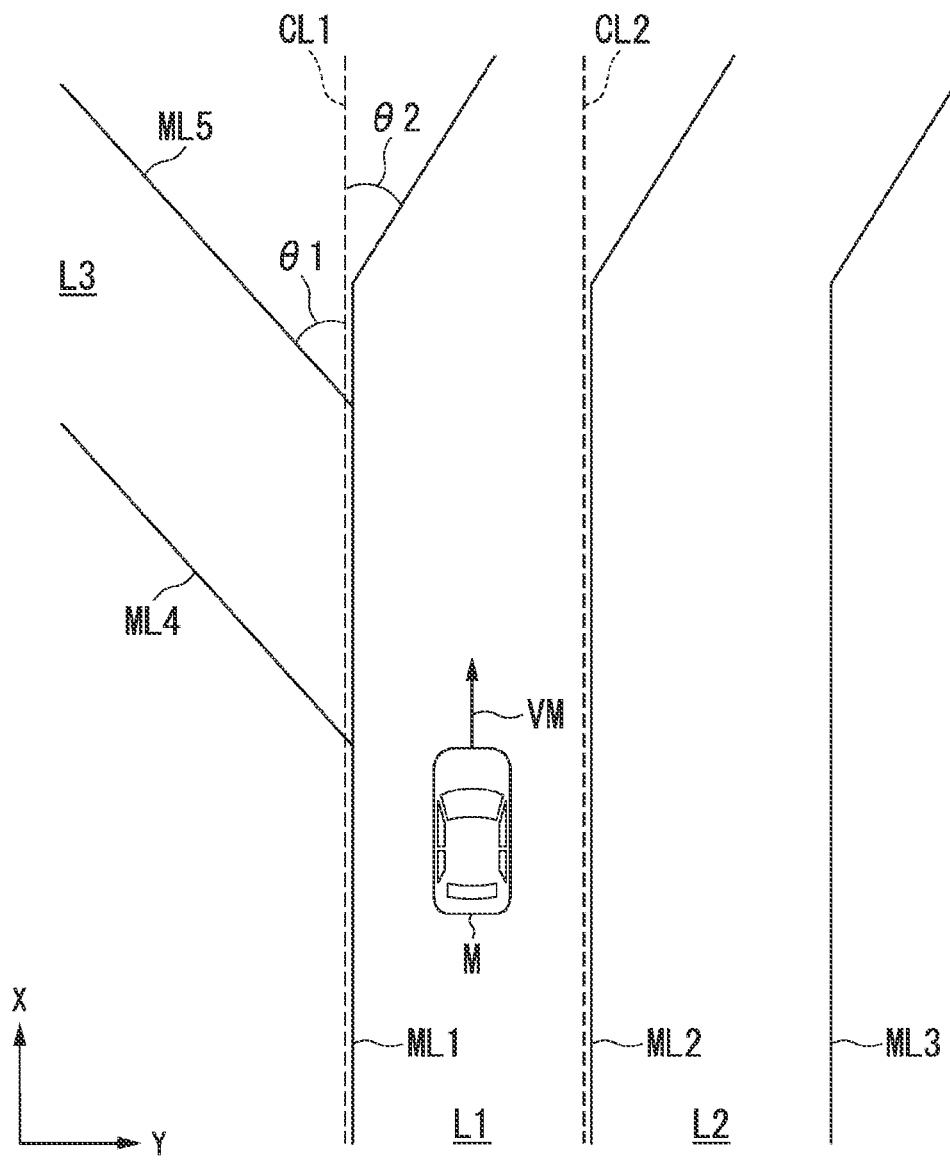
FIG. 8 is a diagram illustrating a determination of driving control to be executed on the basis of an angle formed by the camera partition line and the map partition line.

FIG. 8 is a diagram illustrating a determination of driving control to be executed on the basis of an angle (angle of divergence) formed by the camera partition line and the map partition line. In the example of FIG. 8, the determiner 142 determines whether or not the partition lines CL1 and ML1 or the partition lines CL2 and ML2 match. When the determiner 142 determines that the partition lines do not match and there is no front traveling vehicle, the execution controller 144 recognizes an angle difference between extension directions of the camera partition lines and the map partition line. For example, the execution controller 144 determines whether or not an angle formed by a first direction that is a direction in which the camera partition lines CL1 and CL2 extend and a second direction that is a direction in which the map partition lines ML4 and ML5 partitioning the branch lane L3 extend is equal to or greater than a predetermined angle θth. In the example of FIG. 8, a determination is made as to whether or not an angle θ1 formed by the first direction in the camera partition line CL1 and the second direction of the map partition line ML5 is equal to or greater than the predetermined angle θth, but an angle formed by the camera partition line CL2 and the map partition line ML4 may be used. However, it is possible to make a more appropriate determination using a recognition result on the side in which the lane is changing, by making the determination using the angle θ1 between the partition line ML5 farther from the host vehicle M out of the map partition lines ML4 and ML5 connected to the branch lane L3 and the partition line CL1 on the branch lane L3 side out of the camera partition lines CL1 and CL2.

instead of (or in addition to) the determination using the angle θ1, the execution controller 144 may determine whether or not an angle θ2 formed by the first direction in the camera partition line CL1 and the second direction in the map partition line ML1 is equal to or greater than the predetermined angle θth. When the execution controller 144 determines that the angle θ1 (or θ2) is equal to or greater than the predetermined angle θth, the execution controller 144 determines that the camera partition line recognized by the first recognizer 132 is correct, and determines execution of the third driving control.

In the third scene, the execution controller 144 may execute the driving control and continue the driving control until a predetermined period elapses, when the camera partition line matches the map partition line after executing driving control such as the third driving control or the fourth driving control. This makes it possible to curb frequent switching of the driving control and more stabilize the driving control. The execution controller 144 may end the driving control after a predetermined period of time has elapsed since the execution controller 144 has executed the driving control in a state in which a determination is made that the camera partition line does not match the map partition line. This makes it possible to curb the driving control being continued for a long time in a state in which a determination is made that the camera partition line does not match the map partition line. In this case, the execution controller 144 may perform switching to manual driving, or may execute control for lowering the automation level of the driving control from a current level. The execution controller 144 may set a condition that the host vehicle M travels a predetermined distance or longer instead of (or in addition to) the elapse of the predetermined time.

According to the third scene described above, it is possible to execute more appropriate driving control on the basis of a relative deviation amount between the camera partition line and the map partition line or an angle formed by the respective partition lines and to improve the continuity of driving control (for example, LKAS control) even when the camera partition line does not match the map partition line in the lane change section and there is no front traveling vehicle.

[Processing Flow]

Hereinafter, a processing executed by the automated driving control device 100 of the embodiment will be described. Hereinafter, a driving control process mainly based on a recognition situation of partition line among processes that are executed by the automated driving control device 100 will be mainly described. Hereinafter, several examples will be described. A process to be described below may be repeatedly executed at a predetermined timing or a predetermined cycle, and may be repeatedly executed while the automated driving of the automated driving control device 100 is being executed.

First Embodiment

Figure 9:
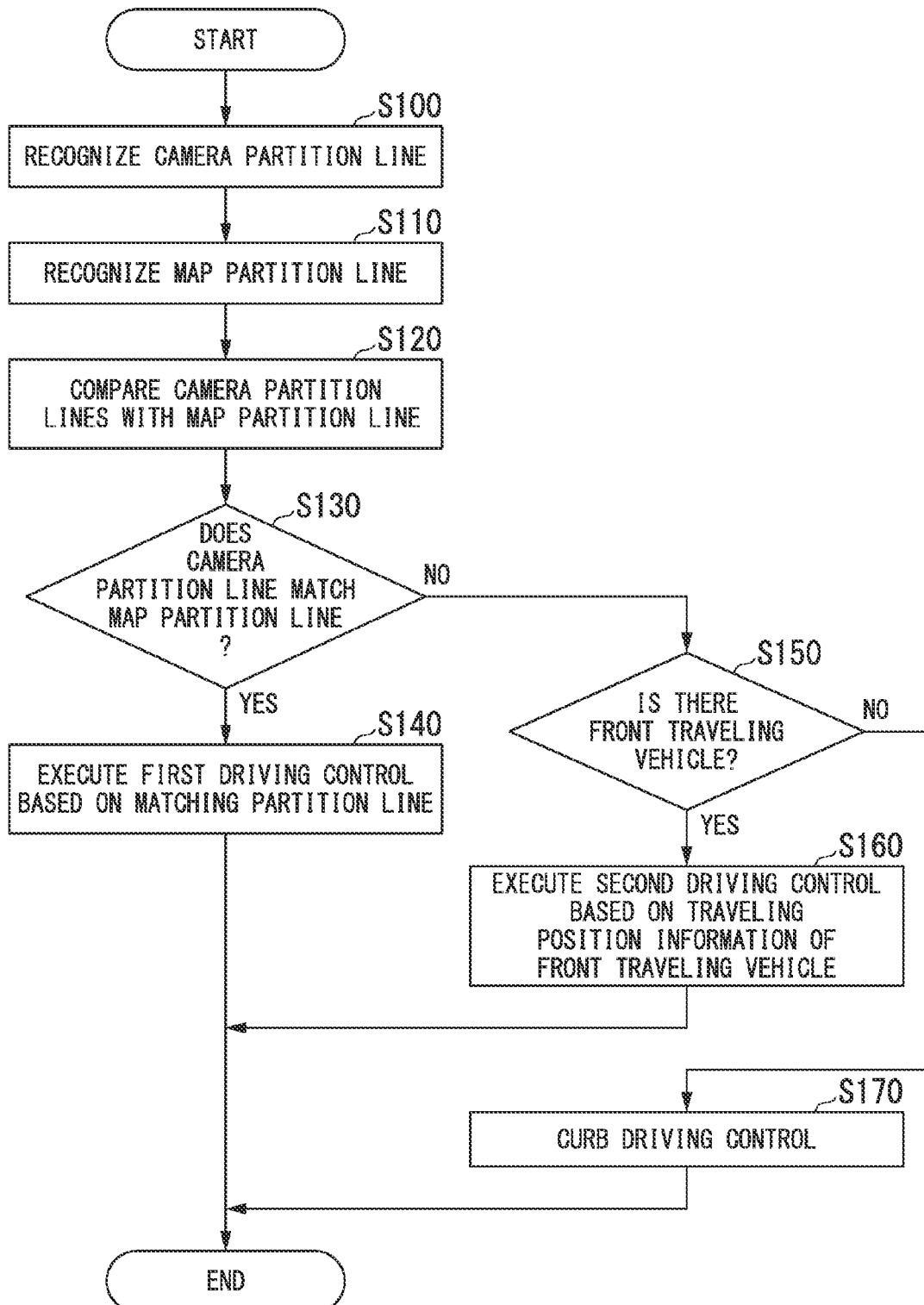
FIG. 9 is a flowchart illustrating an example of a flow of driving control processing in a first embodiment.

FIG. 9 is a flowchart illustrating an example of a flow of driving control process in the first embodiment. In the example of FIG. 9, the first recognizer 132 recognizes a partition line (camera partition line) present around the host vehicle M on the basis of the output of the detection device DD that has detected a surrounding situation of the vehicle (step S100). Next, the second recognizer 134 refers to the map information on the basis of the positional information of the host vehicle M to recognize the partition line (map partition line) present around the host vehicle M from the map information (step S110). Next, the determiner 142 compares the camera partition lines with the map partition line (step S120), and determines whether or not the camera partition line matches the map partition line (step S130).

When a determination is made that the camera partition line matches the map partition line, the execution controller 144 executes driving control (first driving control) based on the matching partition line (the camera partition line or the map partition line) (step S140). When a determination is made that the camera partition line does not match the map partition line, the execution controller 144 determines whether or not there is another vehicle (front traveling vehicle) traveling in front of the host vehicle M (step S150). When the execution controller 144 determines that there is the front traveling vehicle, the execution controller 144 executes driving control (second driving control) based on the traveling position information of the front traveling vehicle (step S160). In the process of step S150, when a determination is made that there is no front traveling vehicle, the execution controller 144 curbs driving control (step S170). Thus, the process of the present flowchart ends.

Second Embodiment

Figure 10:
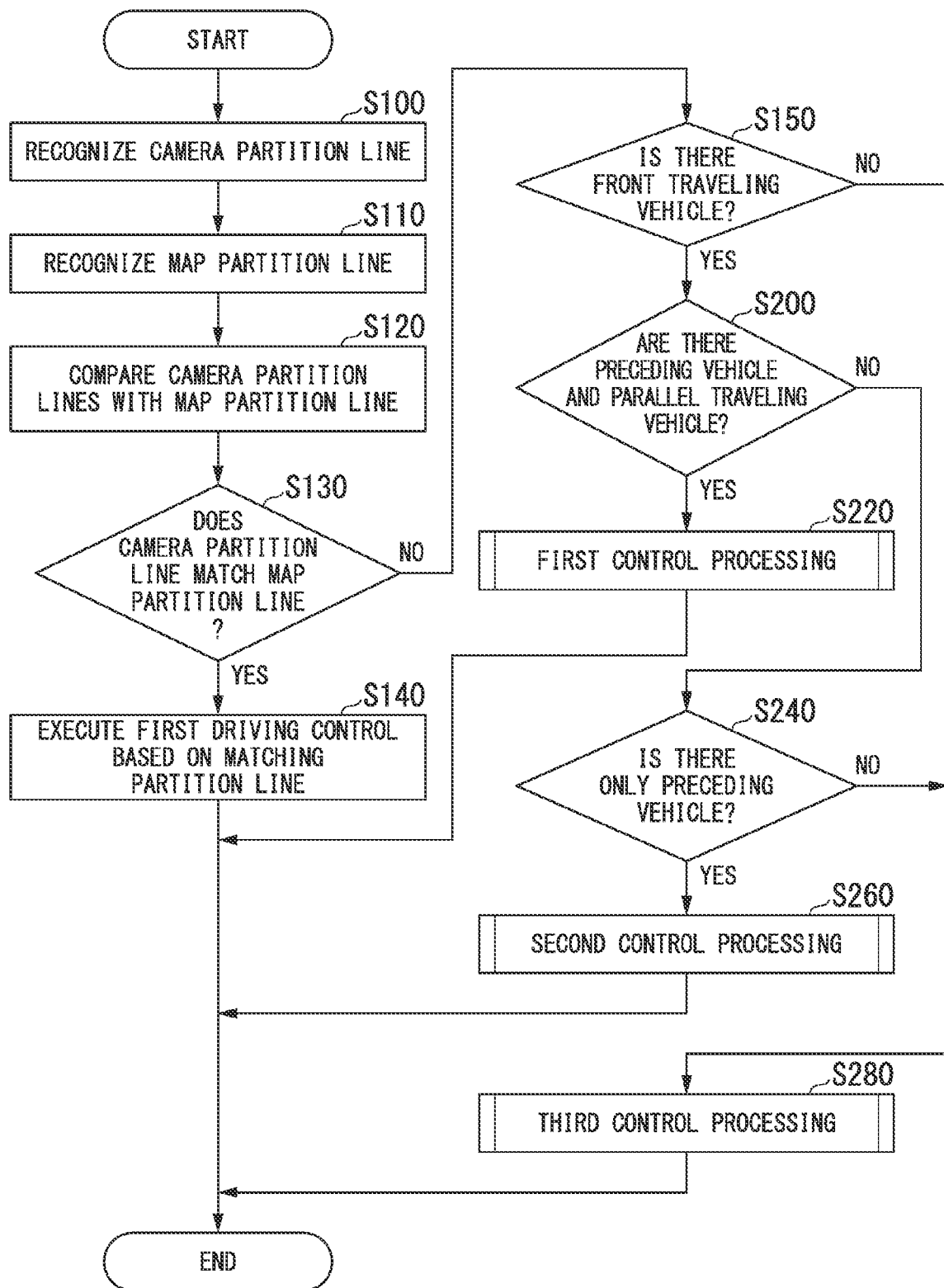
FIG. 10 is a flowchart illustrating an example of a flow of driving control processing in a second embodiment.

FIG. 10 is a flowchart illustrating an example of a flow of a driving control process in a second embodiment. The second embodiment differs from the first embodiment described above in that there are the processes of steps S200 to S280 instead of the processes of steps S160 to S170. Therefore, processes of steps S200 to S280 will be mainly described hereinafter.

In the process of step S150 of FIG. 10, when there is a front traveling vehicle, a determination is made as to whether or not there are the preceding vehicle and the parallel traveling vehicle as front traveling vehicles (step S200). When the execution controller 144 determines that there are the preceding vehicle and the parallel traveling vehicle, the execution controller 144 executes first control processing which will be described below (step S220). The first control processing is, for example, a process that is executed in the first scene described above. Further, when the execution controller 144 determines that there are no preceding vehicle and parallel traveling vehicle, the execution controller 144 determines whether or not only there is the preceding vehicle (step S240). When the execution controller 144 determines that only there is the preceding vehicle, the execution controller 144 executes second control processing, which will be described below (step S260). The second control processing is, for example, a process executed in the second scene described above. Further, when the execution controller 144 determines that only the preceding vehicle is not present (in other words, when the execution controller 144 determines there is the parallel traveling vehicle), the execution controller 144 executes third control processing, which will be described below (step S280). Even when a determination is made in step S150 that there is no preceding vehicle, the execution controller 144 executes the third control processing. The third control processing is, for example, a process that is executed in the third scene described above. Thus, the process of the present flowchart ends.

[First Control Processing]

Figure 11:
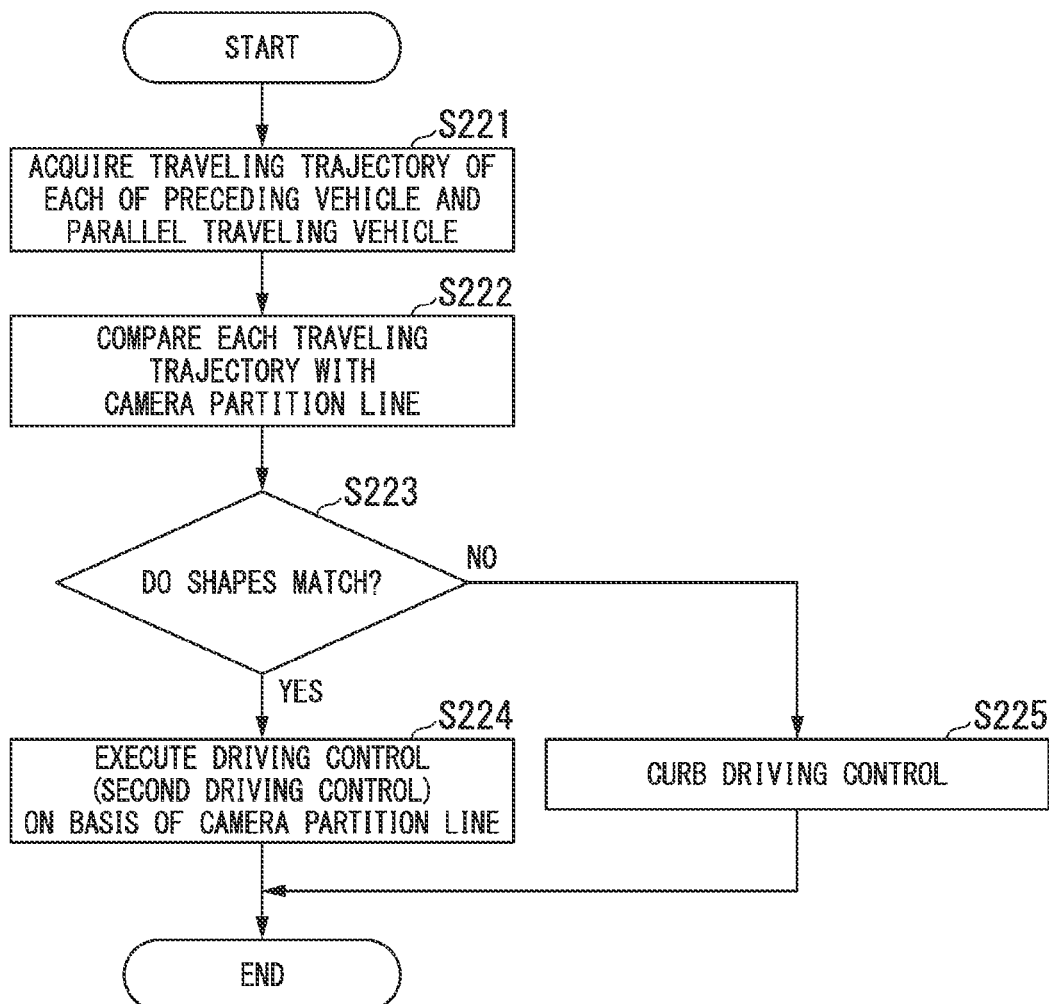
FIG. 11 is a flowchart illustrating an example of a flow of first control processing.

FIG. 11 is a flowchart illustrating an example of a flow of the first control processing. In the example of FIG. 11, the execution controller 144 acquires the traveling trajectory of each of the preceding vehicle and the parallel traveling vehicle (step S221). Next, the execution controller 144 compares each traveling trajectory with the camera partition line (step S222), and determines whether or not the shapes match in a predetermined section (step S223). In the process of step S223, for example, the execution controller 144 finally determines whether or not the shapes match in the predetermined section depending on the average (excluding an outlier) of the degree of matching between the comparison target, a majority decision of individual match determination results, or the like. When the execution controller 144 determines that the shapes match, the execution controller 144 executes driving control (second driving control) on the basis of the camera partition line (step S224).

When the execution controller 144 determines in the process of step S223 that the shapes do not match, the execution controller 144 curbs the second driving control (step S225). Thus, the process of the present flowchart ends.

[Second Control Processing]

Figure 12:
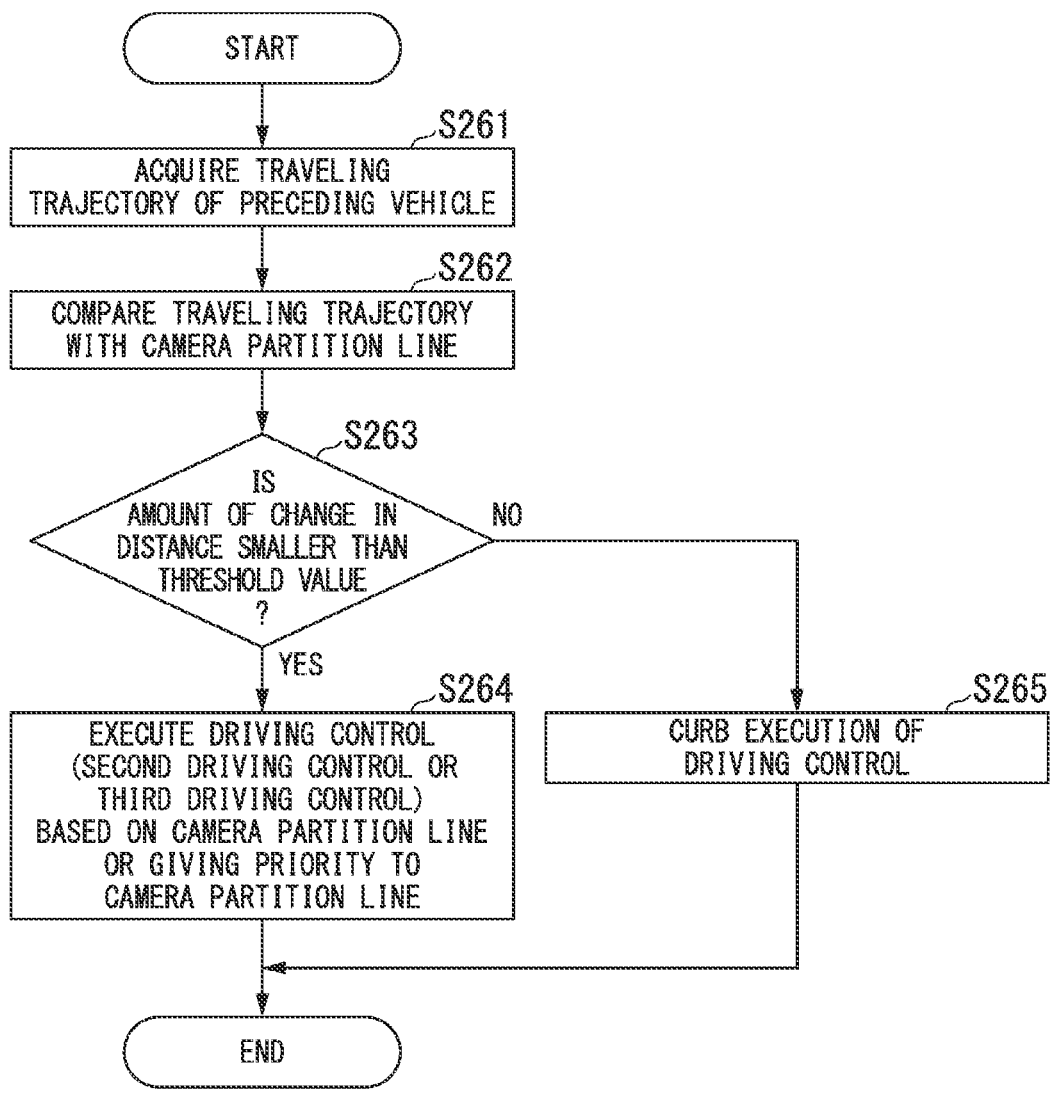
FIG. 12 is a flowchart illustrating an example of a flow of second control processing.

FIG. 12 is a flowchart illustrating an example of a flow of the second control processing. In the example of FIG. 12, the execution controller 144 acquires the traveling trajectory of the preceding vehicle (step S261). Next, the execution controller 144 compares the acquired traveling trajectory with the camera partition line (step S262), and determines whether or not the amount of change in distance is smaller than a threshold value (step S263). When a determination is made that the amount of change in distance is smaller than the threshold value, the execution controller 144 executes driving control based on the camera partition line (second driving control) or driving control giving priority to the camera partition line (third driving control) (step S264). Further, when a determination is made in step S263 that the amount of change in distance is not smaller than the threshold value (is equal to or greater than the threshold value), the execution controller 144 curbs the driving control (step S265). Thus, the process of the present flowchart ends.

Figure 13:
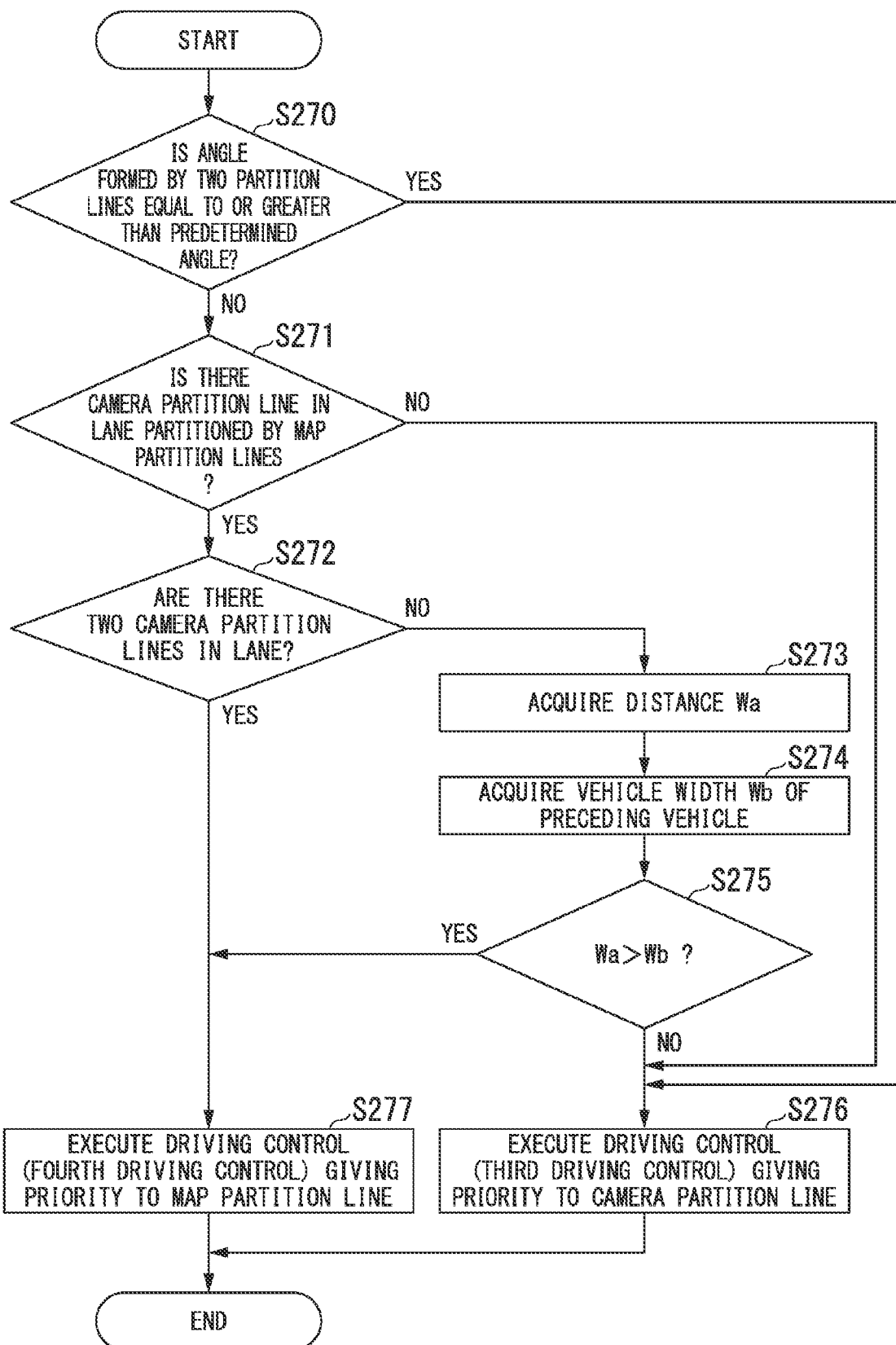
FIG. 13 is a flowchart illustrating an example of a flow of processing of a modification example of the second control processing.

In the second control processing, switching between the driving controls based on the positional relationship between the camera partition line and the map partition line and the vehicle width of the preceding vehicle may be executed instead of the process of FIG. 12. FIG. 13 is a flowchart illustrating an example of a flow of a process of a modification example of the second control processing. In the example of FIG. 13, the execution controller 144 determines whether or not an angle formed by extension directions of the two partition lines (the camera partition line and the map partition line) is equal to or greater than a predetermined angle (step S270). When a determination is made that the angle is not equal to or greater than the predetermined angle, the execution controller 144 determines whether or not a camera partition line is present within a lane partitioned by the map partition lines (step S271). When a determination is made that the camera partition line is present within the lane partitioned by the map partition lines, the execution controller 144 determines whether or not two camera partition lines are present within the lane partitioned by the map partition lines (step S272).

When the execution controller 144 determines that there are not two camera partition lines, the execution controller 144 acquires the distance Wa between the camera partition line present in the lane and the map partition line present on the preceding vehicle side as viewed from the camera partition line (step S273), and acquires a vehicle width Wb of the preceding vehicle (step S274). A processing order of steps S273 and S274 may be reversed.

Next, the execution controller 144 determines whether or not the distance Wa is greater than the vehicle width Wb (step S275). When a determination is made that the distance Wa is not greater than the vehicle width Wb (the distance Wa is equal to or smaller than the vehicle width Wb), the execution controller 144 executes driving control (third driving control) giving priority to the camera partition line (step S276). In this case, the execution controller 144, for example, executes the driving control at the fourth level in the hands-on state while giving priority to the camera partition line. When the execution controller 144 determines that the distance Wa is greater than the vehicle width Wb, or when there are two camera partition lines in the lane in the process of step S272, the execution controller 144 executes driving control (the fourth driving control) while giving priority to the map partition line (step S277). In this case, the execution controller 144 executes, for example, driving control at the second level in the hands-off state. The execution controller 144 may add, to a condition, a case in which the other vehicle m1 is present in the branch lane 12, in addition to a case in which a determination is made that the distance Wa is greater than the vehicle width Wb.

In the process of step S271, when a determination is made that the camera partition line is not present in the lane partitioned by the map partition lines, the execution controller 144 executes driving control (third driving control) based on the camera partition line (step S276). In this case, the execution controller 144, for example, executes the driving control at the fourth level in the hands-on state while giving priority to the camera partition line. When a determination is made in the process of step S270 that the angle is equal to or greater than the predetermined angle, the execution controller 144 executes driving control (third driving control) based on the camera partition lines (step S276). In this case, the execution controller 144, for example, executes the driving control at the third or fourth level in the hands-on state while giving priority to the camera partition line. Thus, the process of the present flowchart ends.

[Third Control Processing]

Figure 14:
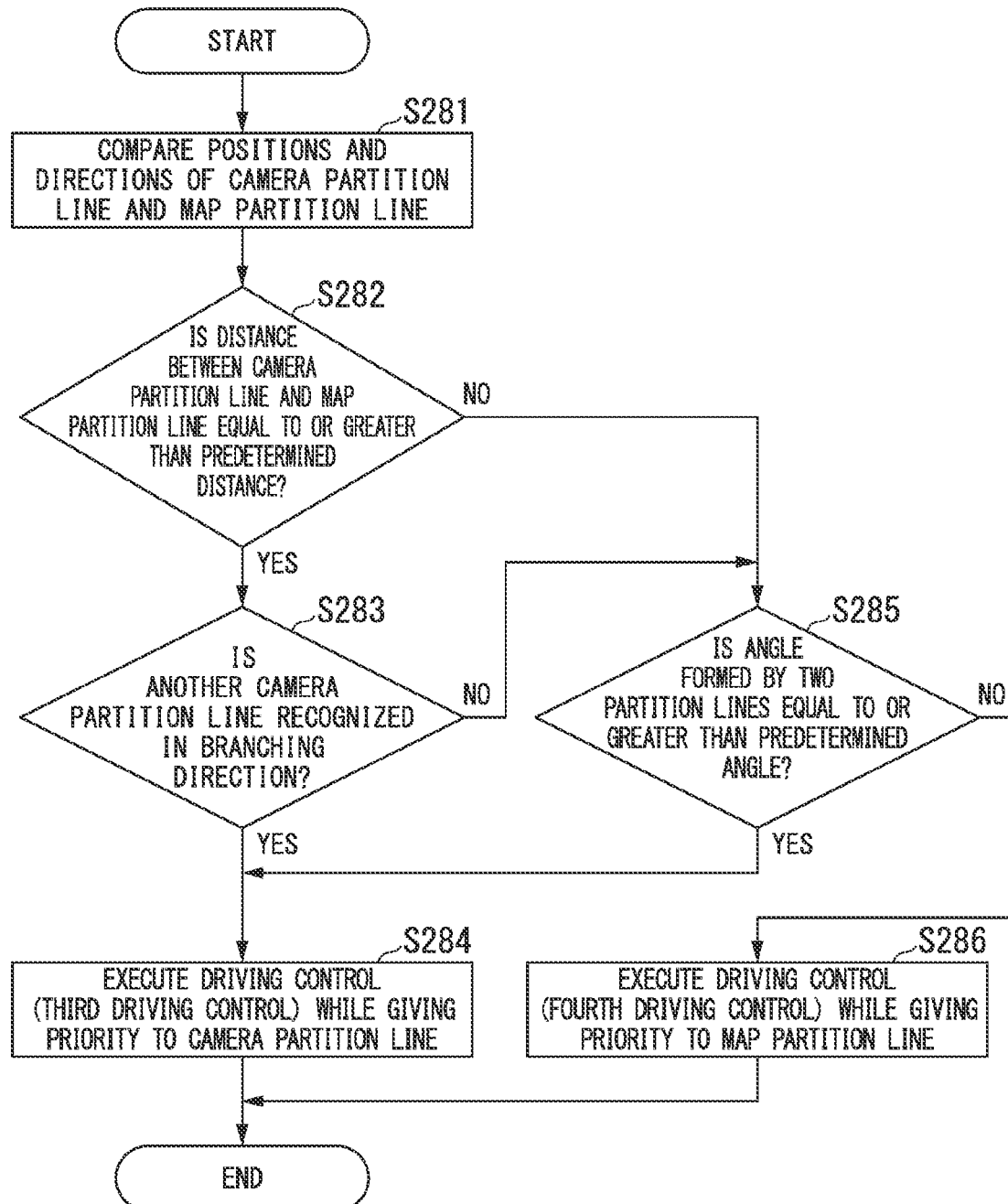
FIG. 14 is a flowchart illustrating an example of a flow of third control processing.

FIG. 14 is a flowchart illustrating an example of a flow of the third control processing. In the example of FIG. 14, the execution controller 144 compares positions of the camera partition lines and the map partition line with the extension directions of the respective partition lines (step S281). Next, the execution controller 144 determines whether or not a distance between the camera partition line and the map partition line is equal to or greater than a predetermined distance (step S282). When the execution controller 144 determines that the distance is equal to or greater than the predetermined distance, the execution controller 144 determines whether or not another camera partition line is recognized in the branching direction (step S283). When the execution controller 144 determines that the other camera partition line is recognized, the execution controller 144 executes driving control (third driving control) for causing the host vehicle M to travel while giving priority to the camera partition line over the map partition line (step S284). In this case, the execution controller 144, for example, executes the driving control at the third or fourth level in the hands-on state while giving priority to the camera partition line.

When a determination is made in the process of step S282 that the distance between the camera partition line and the map partition line is not equal to or greater than the predetermined distance, or a determination is made in the process of step S283 that the other camera partition line is not recognized in the branching direction, the execution controller 144 determines whether or not an angle formed by extension directions of the two partition lines (the camera partition line and the map partition line) is equal to or greater than a predetermined angle (step S285). The predetermined angle here may be a value different from the predetermined angle in the process of step S270 described above. When a determination is made that the angle is equal to or greater than the predetermined angle, the execution controller 144 executes the process of step S284.

When a determination is made that the angle is not equal to or greater than the predetermined angle (is smaller than the predetermined angle), the execution controller 144 executes driving control giving priority to the map partition line over the camera partition line (step S286). Thus, the process of the present flowchart ends.

MODIFICATION EXAMPLES

The processing of the execution controller 144 in the first to third scenes described above may be executed, for example, when the host vehicle M travels in the lane change section or is expected to travel (that is, when the host vehicle M travels within a predetermined distance from the lane change section), and other driving control may be executed in the case of other road situations (for example, when the host vehicle M travels in a section that is not the lane change section).

The execution controller 144 may perform the same processing as described in the second scene to determine the driving control of the host vehicle M even in the first scene (for example, when there are a preceding vehicle and a parallel traveling vehicle) or may perform the same processing as that described in the third scene to determine the driving control to be executed by the host vehicle M even when there is a preceding vehicle as in the first and second scenes. For example, even in the case of the first scene, the execution controller 144 executes processing in the third scene when the recognition accuracy of the recognized preceding vehicle and parallel traveling vehicle (an index value indicating the certainty of whether a vehicle is another vehicle traveling in a traveling lane of the host vehicle M or an adjacent lane) is equal to or smaller than a threshold value.

When there are a plurality of preceding vehicles (or parallel traveling vehicles), the execution controller 144 determines which driving control is to be executed using the closest preceding vehicle (or parallel traveling vehicle) from the host vehicle M, the closest preceding vehicle (or parallel traveling vehicles) may be excluded from determination target vehicles because the closest preceding vehicle is likely to behave differently from a normal vehicle (general vehicle) when the closest preceding vehicle is a specific vehicle (emergency vehicle) such as a police vehicle or fire engine.

According to the above-described embodiment, the vehicle control device includes a first recognizer 132 configured to recognize a surrounding situation including a first partition line partitioning a traveling lane of a host vehicle M and a front traveling vehicle present in front of the host vehicle M, on the basis of an output of a detection device detecting the surrounding situation of the host vehicle M; a second recognizer 134 configured to recognize a second partition line partitioning a lane around the host vehicle M from map information on the basis of position information of the host vehicle M; and a driving controller (the action plan generator 140 and the second controller 160) configured to execute driving control for controlling at least steering out of steering and speed of the host vehicle on the basis of recognition results of the first recognizer and the second recognizer, wherein the driving controller executes the driving control based on the first partition line in a case in which the first partition line does not match the second partition line, a preceding vehicle traveling in front of the host vehicle is recognized by the first recognizer, and an amount of change in a distance between the first partition line and a traveling trajectory of the preceding vehicle is smaller than a threshold value, when the host vehicle travels in a lane change section, and curbs the driving control in a case in which the amount of change is equal to or larger than the threshold value, thereby executing more appropriate driving control according to a result of recognizing the surroundings of the vehicle. According to the embodiment, it is possible to further improve the continuity of the driving control. It is possible to contribute to development of a sustainable transportation system.

According to the embodiment, it is possible to execute (continue) the driving control using more appropriate information on the basis of an amount of deviation between the camera partition line and the map partition line, an angle difference therebetween, a traveling trajectory when there is a front traveling vehicle, a width of the preceding vehicle, and the like in the lane change section in which it is easy for the camera partition line and the map partition line not to be matched.

The embodiment described above can be expressed as follows.

A vehicle control device includes
 a storage medium that stores computer-readable instructions; and
 a processor connected to the storage medium,
 wherein the processor executes the computer-readable instructions to:
  recognize a surrounding situation of a host vehicle including a first partition line partitioning a traveling lane of the host vehicle, on the basis of an output of a detection device detecting the surrounding situation of the host vehicle;
  recognize a second partition line partitioning a lane around the host vehicle from map information on the basis of position information of the host vehicle;
  execute driving control for controlling at least steering out of steering and speed of the host vehicle on the basis of recognition results; and
  execute the driving control based on the first partition line in a case in which the first partition line does not match the second partition line, a preceding vehicle traveling in front of the host vehicle is recognized, and an amount of change in a distance between the first partition line and a traveling trajectory of the preceding vehicle is smaller than a threshold value, when the host vehicle travels in a lane change section, and curb the driving control in a case in which the amount of change is equal to or larger than the threshold value.

Although the embodiments for carrying out the present invention have been described above using the embodiments, the present invention is not limited to these embodiments and various modifications and substitutions can be made without departing from the gist of the present invention.

What is claimed is:

1. A vehicle control device comprising:
a first recognizer configured to recognize a surrounding situation of a host vehicle including a first partition line partitioning a traveling lane of the host vehicle, on the basis of an output of a detection device detecting the surrounding situation of the host vehicle;
a second recognizer configured to recognize a second partition line partitioning a lane around the host vehicle from map information on the basis of position information of the host vehicle; and
a driving controller configured to execute driving control for controlling at least steering out of steering and speed of the host vehicle on the basis of recognition results of the first recognizer and the second recognizer,
wherein the driving controller executes the driving control based on the first partition line in a case in which the first partition line does not match the second partition line, a preceding vehicle traveling in front of the host vehicle is recognized by the first recognizer, and an amount of change in a distance between the first partition line and a traveling trajectory of the preceding vehicle is smaller than a threshold value, when the host vehicle travels in a lane change section, and curbs the driving control in a case in which the amount of change is equal to or larger than the threshold value.

2. The vehicle control device according to claim 1, wherein the driving controller executes the driving control based on the second partition line when two first partition lines partitioning the traveling lane are present in a lane partitioned by two second partition lines.

3. The vehicle control device according to claim 2, wherein the driving controller executes the driving control based on the second partition line in a case in which one of the two first partition lines is not present in the lane, and a distance between the first partition line and the second partition line is greater than a vehicle width of the preceding vehicle, and executes the driving control based on the first partition line in a case in which the distance is equal to or smaller than the vehicle width.

4. The vehicle control device according to claim 1, wherein the driving controller curbs the driving control when the preceding vehicle moves from the traveling lane of the host vehicle to another lane.

5. The vehicle control device according to claim 1, wherein the driving controller continues the driving control until a predetermined period of time has elapsed or the vehicle travels a predetermined distance after the driving controller executes the driving control in a case in which the first partition line matches the second partition line after the driving controller executes the driving control.

6. The vehicle control device according to claim 1, wherein the driving controller ends the driving control after a predetermined period of time has elapsed or after the vehicle has traveled a predetermined distance after the driving controller executes the driving control.

7. The vehicle control device according to claim 1, wherein the driving controller executes the driving control when the host vehicle or a user of the host vehicle has an authority to execute the driving control.

8. A vehicle control method comprising:
recognizing, by a computer, a surrounding situation of a host vehicle including a first partition line partitioning a traveling lane of the host vehicle, on the basis of an output of a detection device detecting the surrounding situation of the host vehicle;
recognizing, by the computer, a second partition line partitioning a lane around the host vehicle from map information on the basis of position information of the host vehicle;
executing, by the computer, driving control for controlling at least steering out of steering and speed of the host vehicle on the basis of recognition results; and
executing, by the computer, the driving control based on the first partition line in a case in which the first partition line does not match the second partition line, a preceding vehicle traveling in front of the host vehicle is recognized, and an amount of change in a distance between the first partition line and a traveling trajectory of the preceding vehicle is smaller than a threshold value, when the host vehicle travels in a lane change section, and curbing the driving control in a case in which the amount of change is equal to or larger than the threshold value.

9. A computer-readable non-transitory storage medium having a program stored therein, the program causing a computer to:
recognize a surrounding situation of a host vehicle including a first partition line partitioning a traveling lane of the host vehicle, on the basis of an output of a detection device detecting the surrounding situation of the host vehicle;
recognize a second partition line partitioning a lane around the host vehicle from map information on the basis of position information of the host vehicle;
execute driving control for controlling at least steering out of steering and speed of the host vehicle on the basis of recognition results; and
execute the driving control based on the first partition line in a case in which the first partition line does not match the second partition line, a preceding vehicle traveling in front of the host vehicle is recognized, and an amount of change in a distance between the first partition line and a traveling trajectory of the preceding vehicle is smaller than a threshold value, when the host vehicle travels in a lane change section, and curb the driving control in a case in which the amount of change is equal to or larger than the threshold value.

* * * * *